Feb. 2, 1954

L. J. KOCI 2,667,828

AUTOMATIC TOASTER

Filed Jan. 30, 1948

INVENTOR.
Ludvik J. Koci
BY McCanna & Morsbach
Attys.

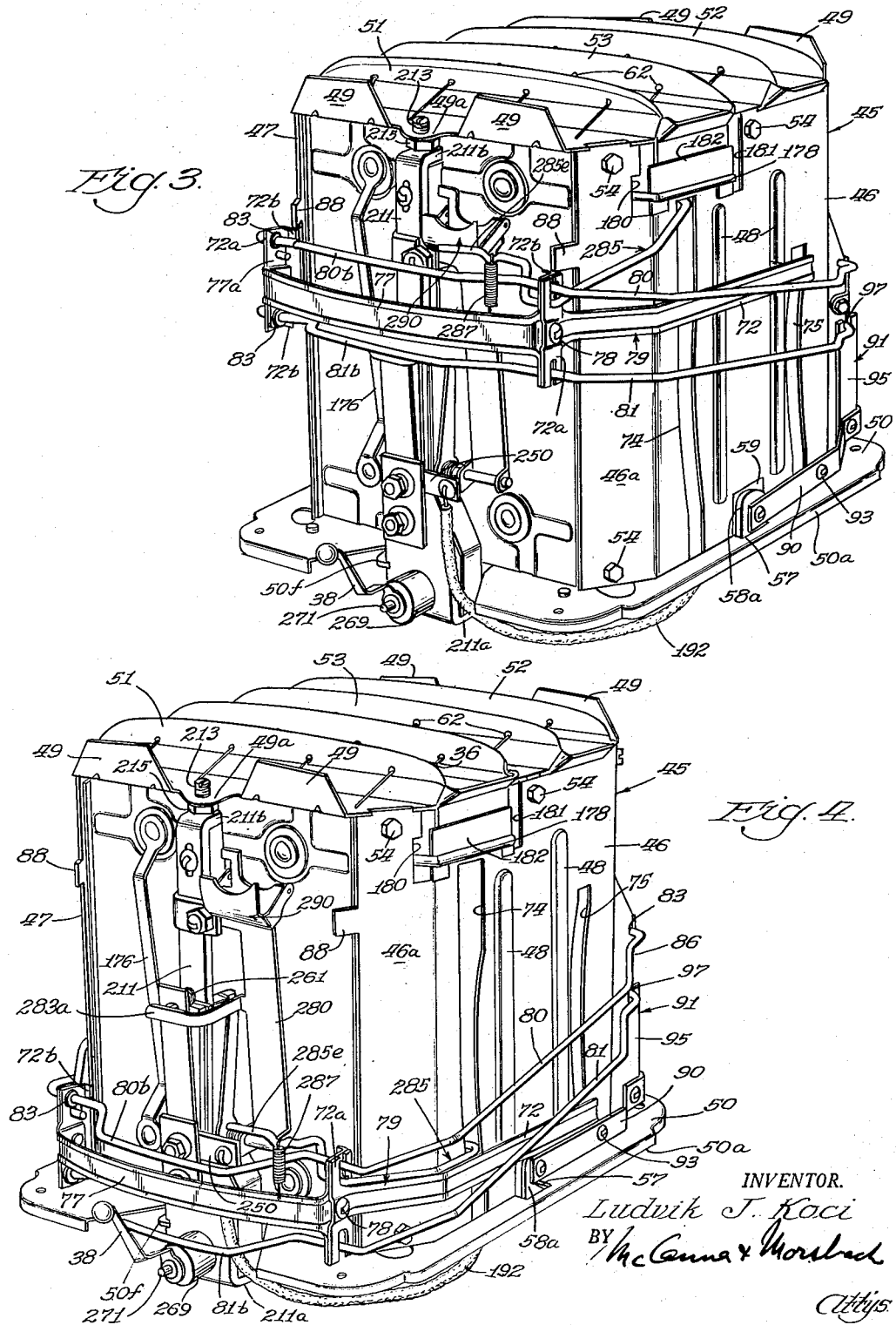

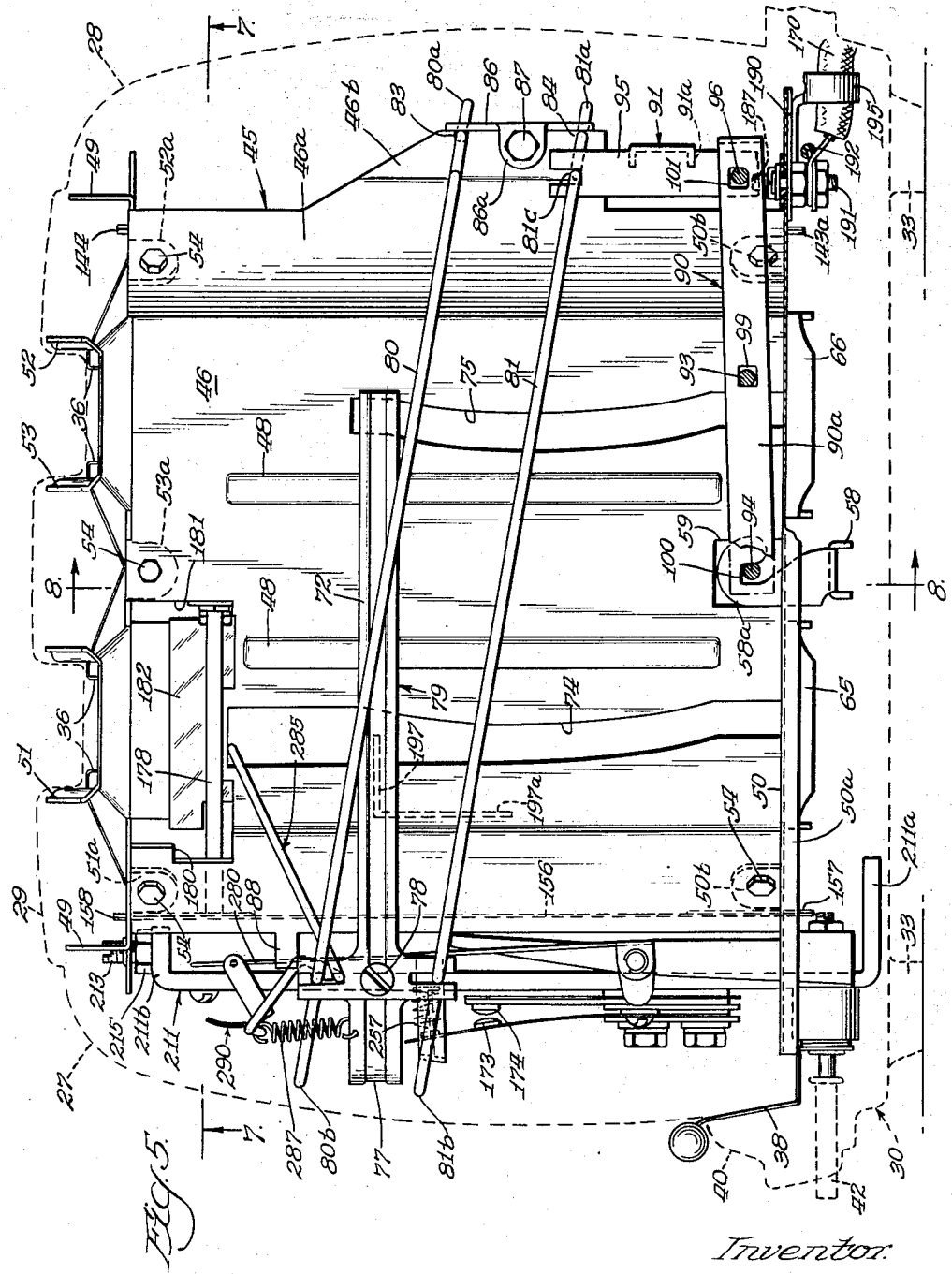

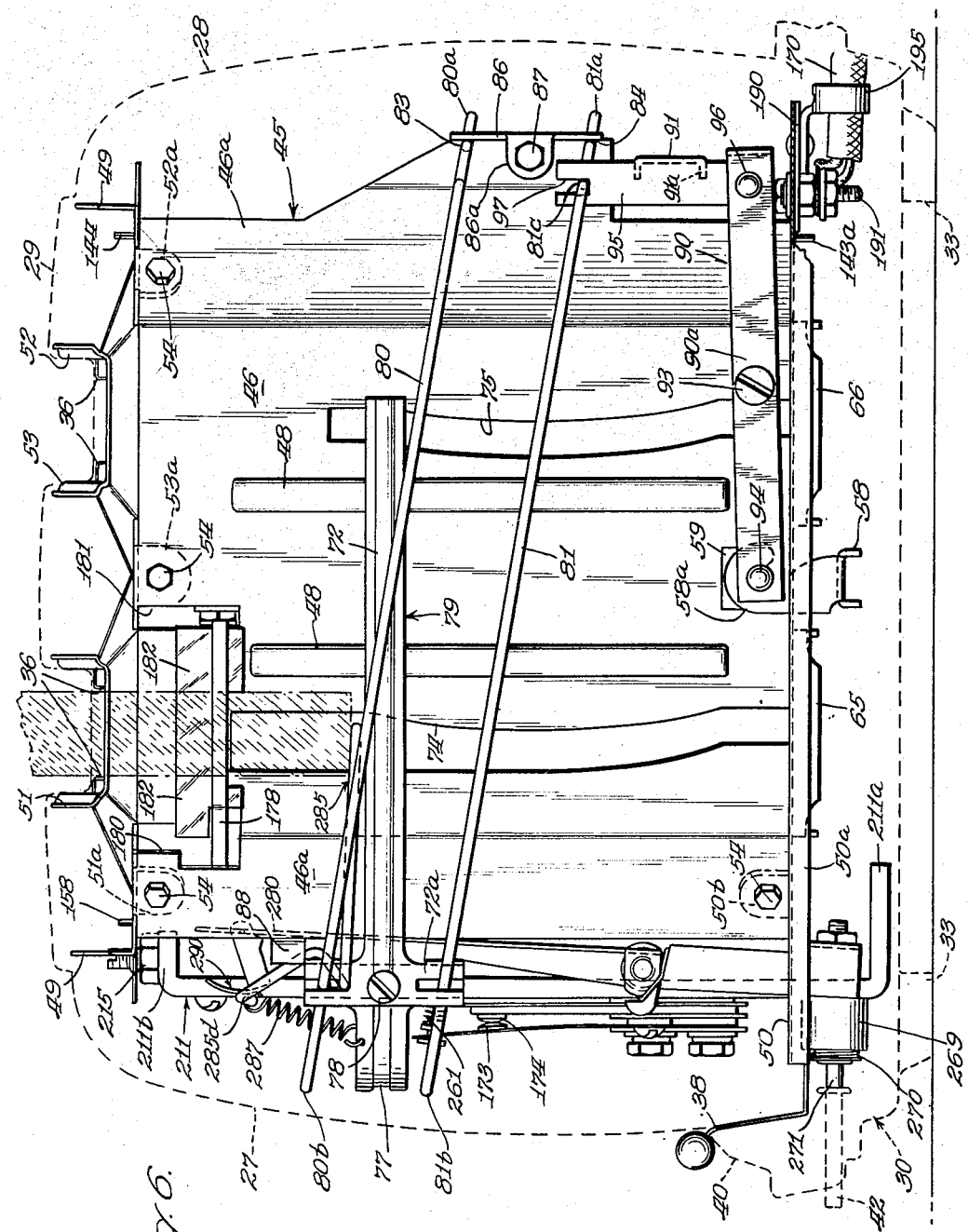

Feb. 2, 1954    L. J. KOCI    2,667,828
AUTOMATIC TOASTER
Filed Jan. 30, 1948    11 Sheets-Sheet 5

Inventor:
Ludvik J. Koci
By McCanna & Morsbach
Attys

Feb. 2, 1954
L. J. KOCI
2,667,828
AUTOMATIC TOASTER
Filed Jan. 30, 1948
11 Sheets—Sheet 6
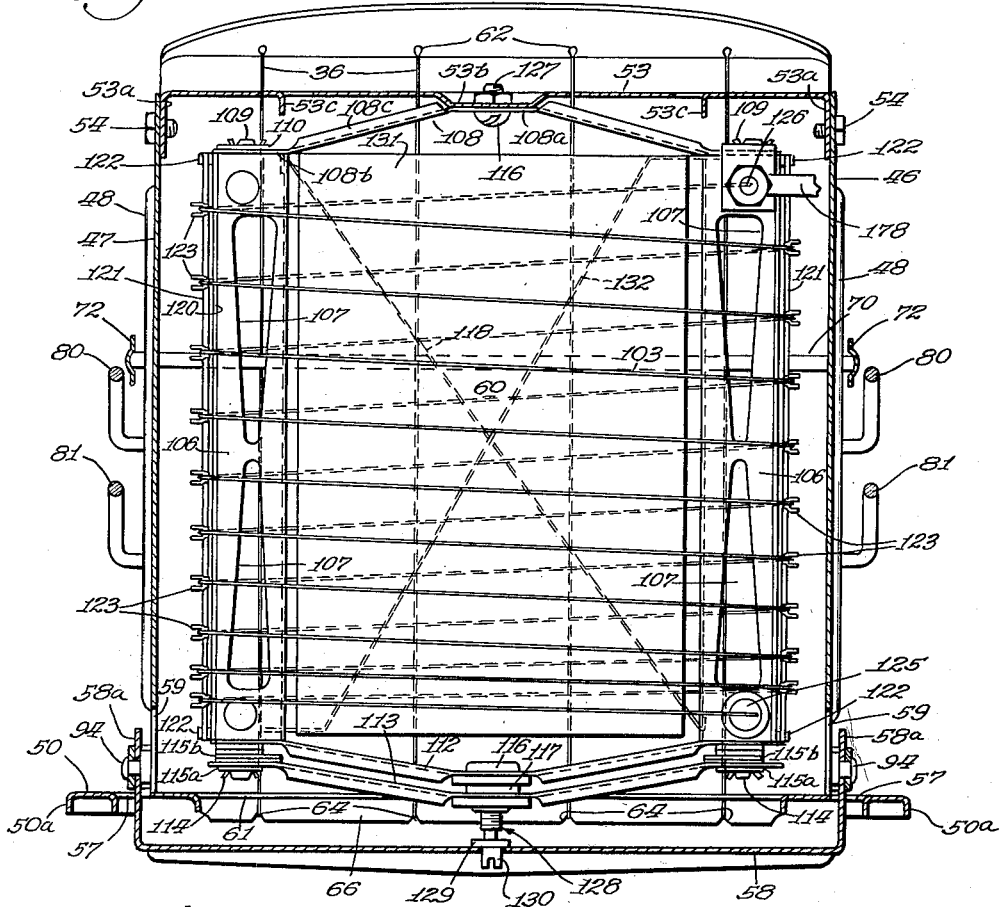
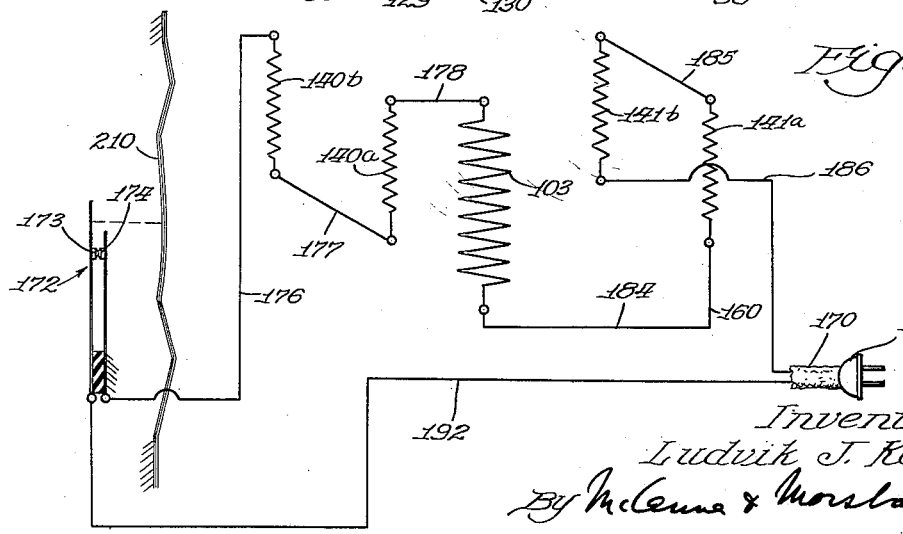
Inventor.
Ludvik J. Koci
By McKenna & Morslink
Attys.

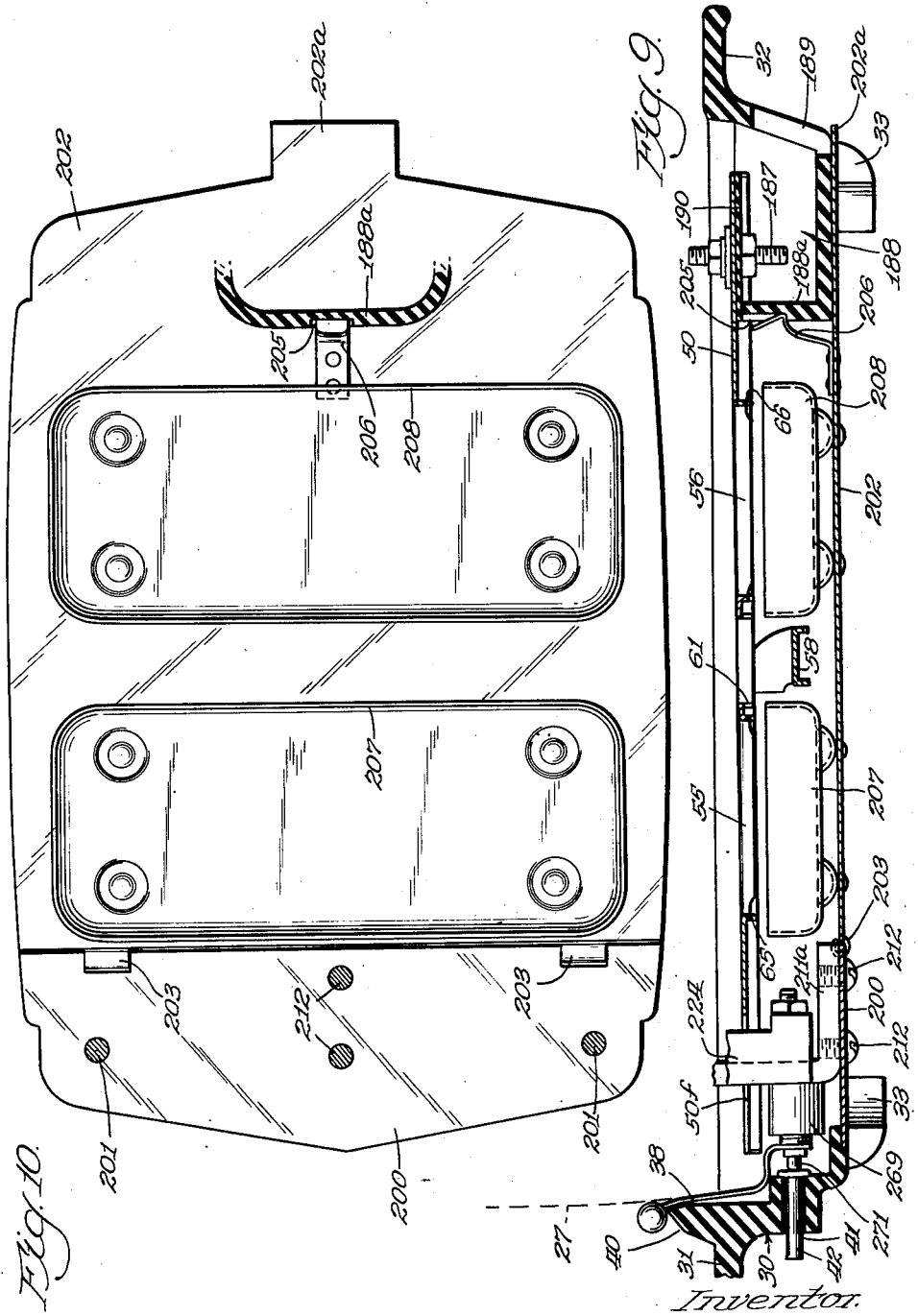

Feb. 2, 1954     L. J. KOCI     2,667,828
AUTOMATIC TOASTER
Filed Jan. 30, 1948     11 Sheets-Sheet 8
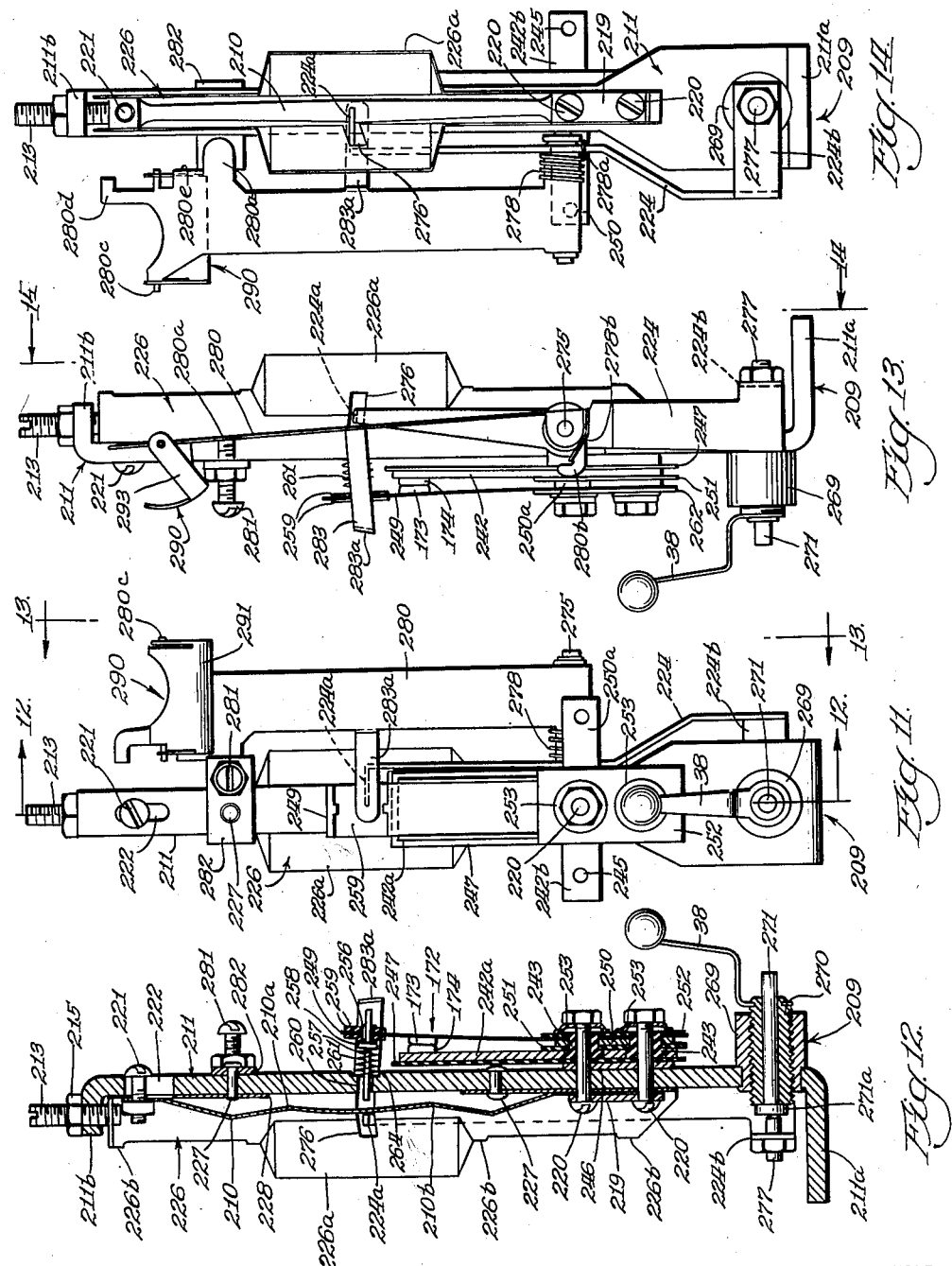
INVENTOR.
Ludvik J. Koci
BY McKenna & Morsbach
Attys.

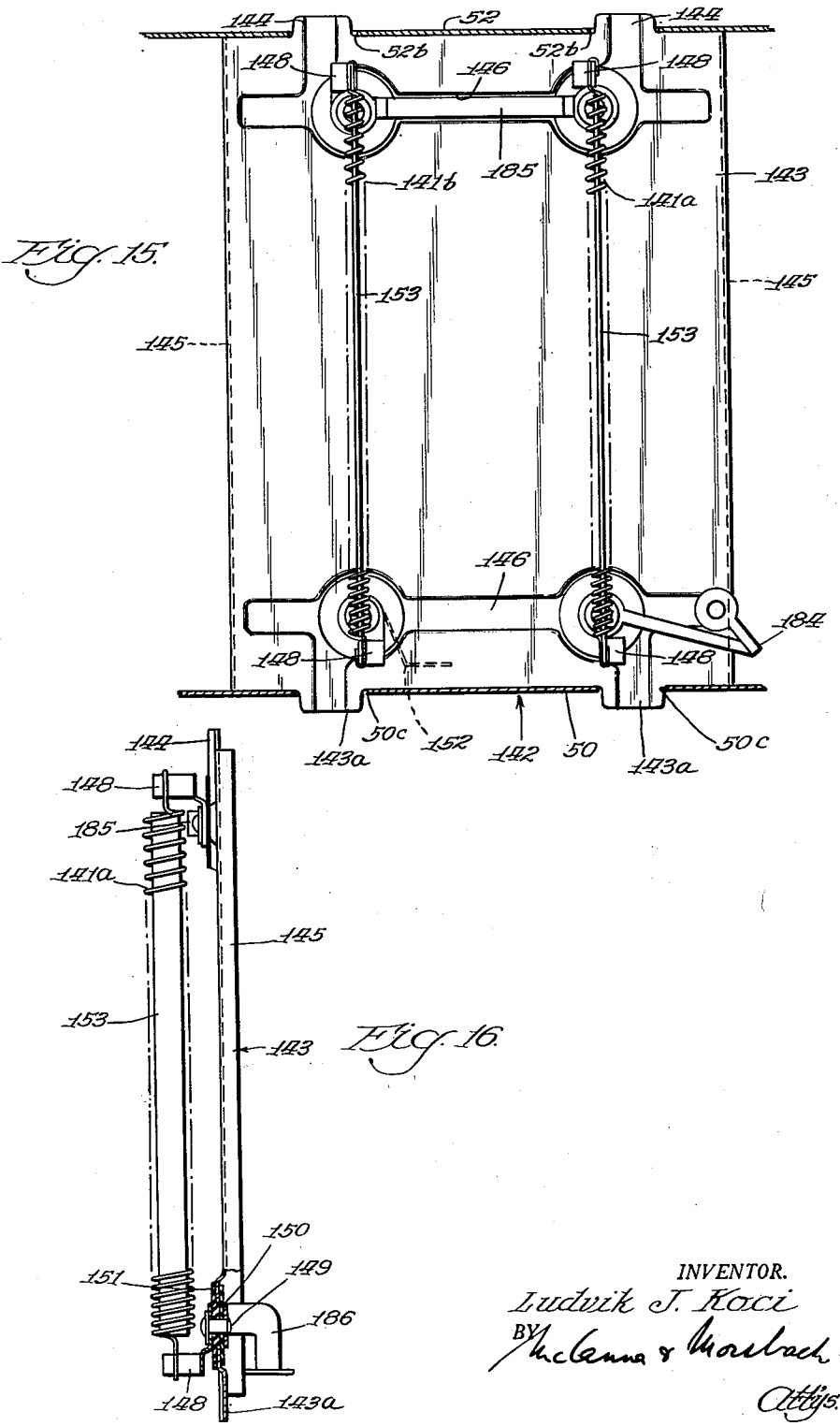

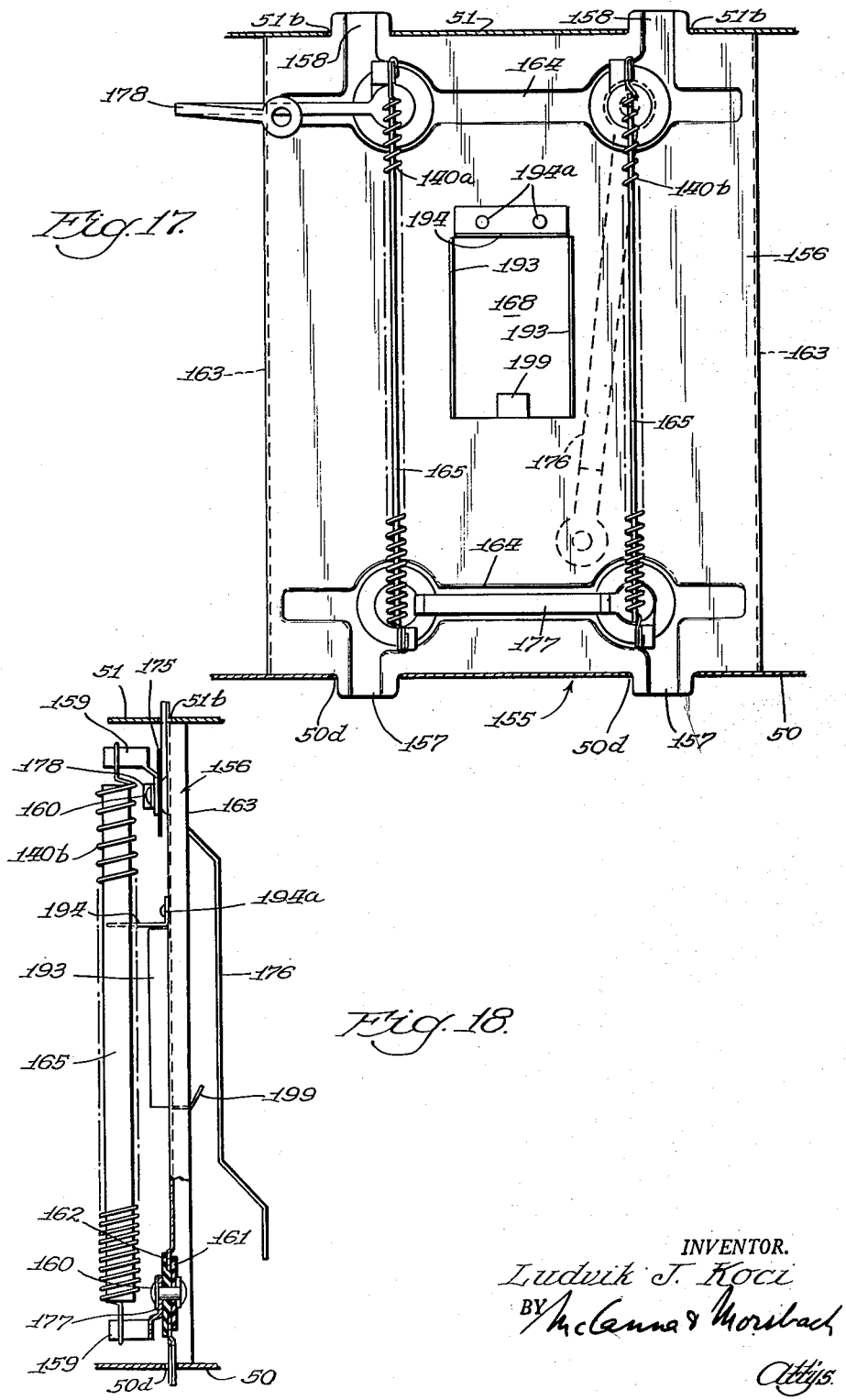

Feb. 2, 1954   L. J. KOCI   2,667,828
AUTOMATIC TOASTER
Filed Jan. 30, 1948   11 Sheets-Sheet 11

INVENTOR.
Ludvik J. Koci
BY McCanna & Morsbach
Attys.

Patented Feb. 2, 1954

2,667,828

UNITED STATES PATENT OFFICE 2,667,828

AUTOMATIC TOASTER

Ludvik J. Koci, Riverside, Ill., assignor to Sunbeam Corporation, Chicago, Ill., a corporation of Illinois Application January 30, 1948, Serial No. 5,247

24 Claims. (Cl. 99—329)

The present invention relates to cooking devices for heat treating food, and more particularly relates to automatic toasters.

Automatic toasters have been extensively used in recent years. Such automatic toasters have generally comprised an arrangement whereby toast is inserted into the toaster and manually moved to the toasting position whereupon the bread carriage is releasably latched in such toasting position. In moving the bread carriage to the toasting position an energy storage means is conventionally stressed. Automatic means are provided to release the carriage when the toasting operation is completed whereby the energy storage means is released to cause so-called "pop-up" action of the toast and bread carriage so that the toast may readily be removed therefrom. It would be desirable to provide a more fully automatic toaster, that is one which would go through its entire toasting operation in response to only the insertion of the bread slice. Such a toaster would include means for automatically moving the bread slice to the toasting position whereupon the toasting operation could be performed thereon and at the end of the toasting interval the bread slice would be moved to a position for ready removal thereof from the toaster without any manual operation other than the insertion of the bread slice into the opening therefor defined in the toaster. One such more fully automatic toaster is disclosed and claimed in United States Letters Patent 2,347,385, Wright and Jepson, granted April 25, 1944, and assigned to the same assignee as the present application. The present invention is an improvement on the arrangement disclosed and claimed in the above mentioned Wright and Jepson patent in so far as more fully automatic operation of an automatic toaster is concerned.

In arrangements prior to the present invention expensive and complicated motive means were required both for propelling the toast to its toasting position as well as to return the same to a position where ready removal from the toaster can be accomplished. It would be desirable to provide an arrangement in which all complicated motive means for propelling the bread slices in their movement to and from the toasting position could be eliminated and wherein the high electrical energy which of necessity is required to be supplied to the heating elements of the toaster to perform the heating operation of the bread slices could be converted to the necessary mechanical energy to provide the motive means for moving the bread slices.

Various arrangements have been proposed for use in electric toasters in attempts to so determine the toasting interval that uniform toasting of a plurality of bread slices during successive use intervals of a toaster is obtained. It will be understood that the determination of the toasting interval to provide for a uniform degree of toasting regardless of the character of the bread and under any and all operating conditions of the toaster is dependent upon a variety of different factors. The type of bread, i. e., rye, whole wheat, raisin or white, as well as the bread slice size and thickness and the degree of dryness of the bread determine the degree of toasting during a given toasting interval. Also changes in the environment temperature and variations in the excitation voltage of the heating elements as well as variations in the amount of heat generated by the heating elements, as between an initial toasting operation and immediately succeeding toasting operations, represent additional variable factors influencing the degree of toasting of a particular bread slice during a given period of toasting time. The usual commercial practice has been that of resolving all of these factors on an empirical basis and employing clock or thermal timers having the function of measuring out an arbitrary toasting interval and then deenergizing the toasting heating elements. Various elaborate refinements have been made in mechanisms of this type in attempts to obtain more uniform toasting of the bread slices. Such mechanisms have not only been high in initial cost but have required costly service operations and more important fall far short of the goal of producing uniform toasting under any and all operating conditions. It has been discovered that the only accurate index which may be relied upon to determine the degree of toasting of a bread surface is the temperature of that surface. Recently there has been disclosed and claimed in a copending application for Letters Patent of the United States Serial No. 639,934, Koci, filed January 9, 1946, now Patent 2,459,169, a radiation thermostat control for an automatic toaster in which a bimetallic element is employed which is responsive only to the heat radiated from a large area of the bread surface being toasted. The present invention employs a control arrangement embodying the principles of the above mentioned copending Koci application.

In a control device which depends upon the surface temperature of a large area of the bread slice being toasted it is apparent that all the direct radiation from the toasting elements must be prevented from reaching such a control device. Conventional toasting elements do not lend themselves readily to such an arrangement since it would be very difficult to provide a reliable control arrangement responsive to a large amount of radiation emitted from a large area of the bread surface by virtue of its temperature rise during the toasting operation without also being affected by direct radiation from the heating elements themselves. It would be desirable to provide new and improved heating elements which would permit such desired use of a surface temperature radiation control while still providing uniform toasting over the bread surface at all times.

Accordingly it is an object of the present invention to provide a new and improved automatic toaster.

It is another object of the present invention to provide an improved means for automatically moving the material being toasted to and from the toasting position.

It is another object of the present invention to provide improved thermomotive means for moving the toast racks from position to position.

A further object of the present invention is to provide a more fully automatic toaster of a new and improved type in which the manual placing of a slice of bread into the toaster starts the mechanism through a cycle of operations during which the bread is toasted and subsequently made available for manual removal from the toaster and in which all these operations are automatically performed in response to merely placing the bread in the toaster and removing it therefrom.

A still further object of the present invention is to provide new and improved heating elements for an automatic toaster which permit uniform toasting of the bread surface regardless of the age or extent of use of the toaster and which furthermore are especially adapted for a control arrangement in which a large amount of the heat radiated from a large area of the bread face being toasted is employed to control the toasting interval in a manner so that said control arrangement is not affected by direct radiation from the toasting elements, which permit of ready shielding in this respect.

Another object of the present invention is concerned with a new and improved bread carriage and mechanism for converting high electrical energy normally required to be supplied to a toaster to sufficient mechanical energy to move the bread carriage to and from the toasting position.

Still another object of the present invention is the provision of an efficient reliable frictionless motion multiplying means for converting the limited expansion and contraction of a metal member with heating and cooling to the extensive uniform motion to and from the toasting position required of the bread carriage.

Further objects and advantages of the present invention will become apparent as the following description proceeds, and the features of novelty which characterize the invention will be pointed out with particularity in the claims annexed to and forming a part of this specification.

For a better understanding of the present invention reference may be had to the accompanying drawings in which:

Fig. 3 is a perspective view of the toaster of the present invention with the shell and base thereof removed and with the mechanism shown in the toast receiving position;

Fig. 4 is a view similar to Fig. 3 but showing the toaster with the bread supporting carriage moved to the toasting position;

Fig. 5 is a side elevational view partly in section of the toaster mechanism of the present invention with the shell and base indicated by dashed lines, with the bread supporting carriage indicated in the toast receiving position, and with the control switch in the open position;

Fig. 6 is a view similar to Fig. 5 with the mechanism of the present invention shown in the position it assumes immediately after a slice of bread has been inserted into the toaster for toasting purposes to close the control switch but before the bread has moved into the toasting position.

Fig. 8 is the sectional view taken on line 8—8 of Fig. 5 showing the central heating element and the thermomotive device employed in the automatic toaster of the present invention;

Fig. 9 is a sectional view through the base of the automatic toaster showing the bottom cover assembly and the method of supporting the crumb trays;

Fig. 10 is a top view of the bottom cover assembly shown in Fig. 9 of the drawings;

Fig. 11 is an end view of the thermostat assembly of the automatic toaster of the present invention with the switch in the closed position;

Fig. 12 is a sectional view taken on line 12—12 of Fig. 11;

Fig. 13 is a side elevational view of the assembly of Fig. 11 looking in the direction of the arrows 13—13 of Fig. 11;

Fig. 14 is a rear elevational view of the assembly of Fig. 11 looking substantially in the direction of the arrows 14—14 of Fig. 13;

Fig. 15 is a front elevational view of the cord end heating element of the automatic toaster of the present invention;

Fig. 16 is a side view of the end heating element of Fig. 15;

Fig. 17 is an elevational view similar to the Fig. 15 of the thermostat end heating element of the automatic toaster of the present invention;

Fig. 18 is a side view of the end heating element of Fig. 17;

Fig. 19 is a schematic circuit diagram of the electrical circuit and control arrangement of the automatic toaster of the present invention;

As was mentioned above, the automatic toaster of the present invention embodies the bread surface temperature radiation control arrangement disclosed and broadly claimed in the above mentioned copending Koci application.

FRAME AND SHELL STRUCTURE

Figure 1:
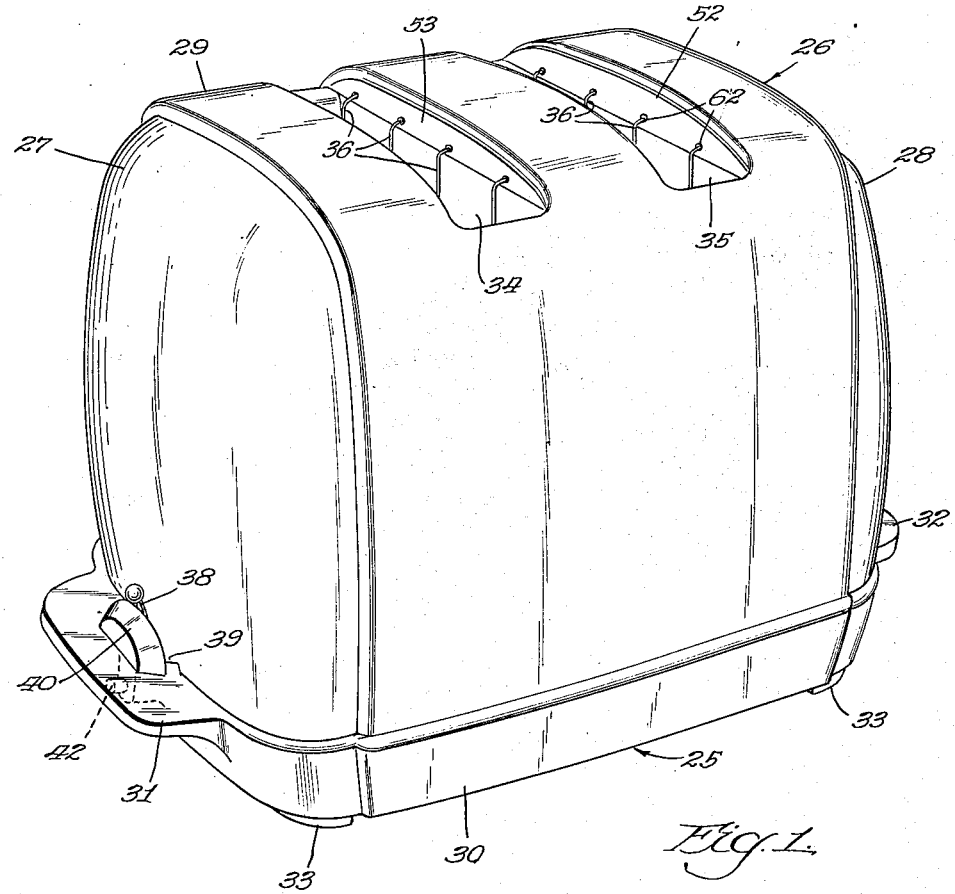
Fig. 1 is a perspective view of an automatic toaster embodying the present invention.
Figure 2:
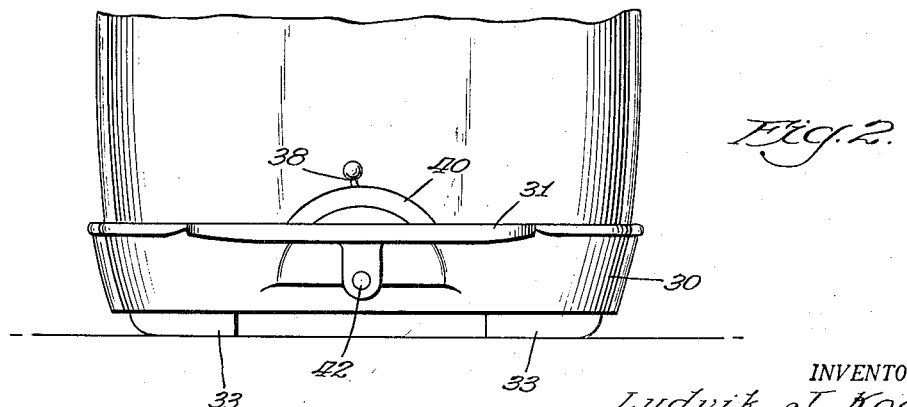
Fig. 2 is a partial end view of the toaster of Fig. 1 for the purpose of better showing the only manual controls provided thereon.

Referring now to the drawings the automatic toaster generally designated by the reference numeral 25 in Fig. 1 of the drawings comprises an outer casing generally designated at 26 comprised of a pair of end shells 27 and 28 and a U-shaped central shell member 29 cooperating with the end shells 26 to provide an outer housing or casing for the toaster. A suitable base 30 is also provided, preferably formed of a suitable molded insulating material which base includes integrally formed handle portions 31 and 32 at either end thereof and suitable feet 33 at the bottom thereof. It will be understood that the particular configuration of the outer shell 26 and the base 30 is immaterial as far as the present invention is concerned, although these elements will be designed to produce the desired esthetic effect since they are the exposed portions by means of which the toaster may be given a very pleasing appearance.

The shell or outer casing 26 includes spaced parallel slots 34 and 35 at the top for the insertion of slices of bread to be controlled in a manner to be described hereinafter by certain features of the present invention. It will be apparent that the illustrated embodiment is a conventional two slice toaster. Actually it might equally well be a single slice toaster or a toaster for more than two slices. Visible through the toasting slots 34 and 35 are a plurality of vertically disposed guide wires 36 preferably formed of stainless steel and suitably suppotred in the toaster frame to be described hereinafter. These guide wires define the toasting chambers and guide the toast in its vertical movement within the toasting slots 34 and 35 without substantially interfering with radiation between the heating elements and the bread to be toasted as is brought out by the following description.

In accordance with the present invention the automatic toaster 25 requires substantially no manual control other than the insertion of the bread to be toasted in the slots 34 and 35 and the removal thereof upon completion of the toasting operation. For the purpose of controlling the relative lightness or darkness of the toast produced there is provided a manually actuable color control lever 38 movable through a substantial arc within a slot 39 defined between an upwardly extending arcuate member 40 and the end shell 27. Preferably the arcuate member 40 is an integral molded extension of the base 30. The control lever 38 is pivotal about an axis extending through an opening 41 defined in the base 30 adjacent the handle 31, see Fig. 9 of the drawings. The opening 41 is adapted to receive a manually actuable cut out plunger 42 whereby the toasting operation may be terminated at will. This plunger 42 which is reciprocally movable, is described in greater detail hereinafter with respect to its relation to the other mechanism of the automatic toaster 25. The lever 38 and the plunger 42 are the only manual controls employed or required in the automatic toaster 25 embodying the present invention.

Referring now to Figs. 3, 4, 5, 6, 7 and 8 of the drawings, where in some cases the shell 26 and the base 30 are indicated by dashed lines, it is noted that within the outer shell or housing 26 there is disposed an inner frame generally designated at 45. This inner frame comprises a pair of side frame plates 46 and 47, a sub-base plate 50, a pair of end top frame plates 51 and 52 and a center top frame plate 53. For the purpose of increasing the rigidity thereof the side frame plates may be provided with a plurality of vertical ribs 48 and a substantial portion of each end of the side frame plates 46 and 47 is bent at an angle, these angular extensions being designated as 46a and 47a for the plates 46 and 47 respectively. For the purpose of providing additional strength the sub-base 50 is provided with a depending peripheral flange 50a around a substantial portion thereof. The top frame plates 51, 52 and 53 are indicated as having a generally U-shaped configuration to provide additional rigidity with the open end of each U extending upwardly. The end top frame plates 51 and 52 are each spaced from the center top frame plate to define a pair of spaces or slots in alignment with the bread receiving slots 34 and 35 defined in the shell 26. The arms of the U-shaped end top frame plates 51 and 52 adjacent the respective ends of the toaster are divided to form two vertical extensions 49 for supporting the respective end shells 27 and 28. The top end plates 51 and 52 are preferably identical to decrease the number of different parts and each is provided with a horizontal extension 49a between the vertical extensions 49. The horizontal extension 49a of the end top frame plate 51 contains a screw receiving opening to perform a holding operation described hereinafter. The frame plates or members 46, 47, 50, 51, 52 and 53 may be joined to form the frame 45 by means of any suitable fastening means such as bolts, screws, welding or the like. It may be noted in Figs. 5 and 6 of the drawings that the top frame plates 51, 52 and 53 are provided with downwardly extending tabs 51a, 52a and 53a respectively so as to be fastened to side frame plates 46 and 47 by means of self-tapping screws 54. Similarly the sub-base 50 is provided with punched out upwardly extending tabs 50b which are fastened to the angular extensions 46a and 47a of the side frame plates 46 and 47 respectively by self-tapping screws 54.

The sub-base 50 is provided with suitable flanged openings 55 and 56 defined therein disposed in alignment with the bread receiving slots 34 and 35 respectively as well as the spaces defined between the end top frame plates 51 and 52 and the center top frame plate 53, whereby any crumbs from the bread being toasted may fall through the sub-base 50 into suitable crumb receiving trays to be described hereinafter and clearly shown in Figs. 9 and 10 of the drawings. The sub-base 50 is further provided with a plurality of additional openings for accommodating certain elements of the toaster. For example openings 57 defined in the sub-base 50 (see Figs. 3, 4, 7 and 8) are provided to receive extensions of a lifter lever depressor bar 58 described in detail hereinafter. The side frame plates 46 and 47 are also each provided with a notched out portion 59 along the bottom edge thereof cooperating with the openings 57 in the sub-base 50 so as not to interfere with movement of the lifter lever depressor bar 58. Openings 50c and 50d for receiving and supporting extensions of the heating element assemblies are also provided in the sub-base 50 and as shown in Figs. 8 and 9 of the drawings an opening 61 is provided between the flanged openings 55 and 56 for permitting connection between a thermomotive device generally designated at 60, for causing movement of the toast to and from the toasting position, and the depressor bar 58.

Figure 7:
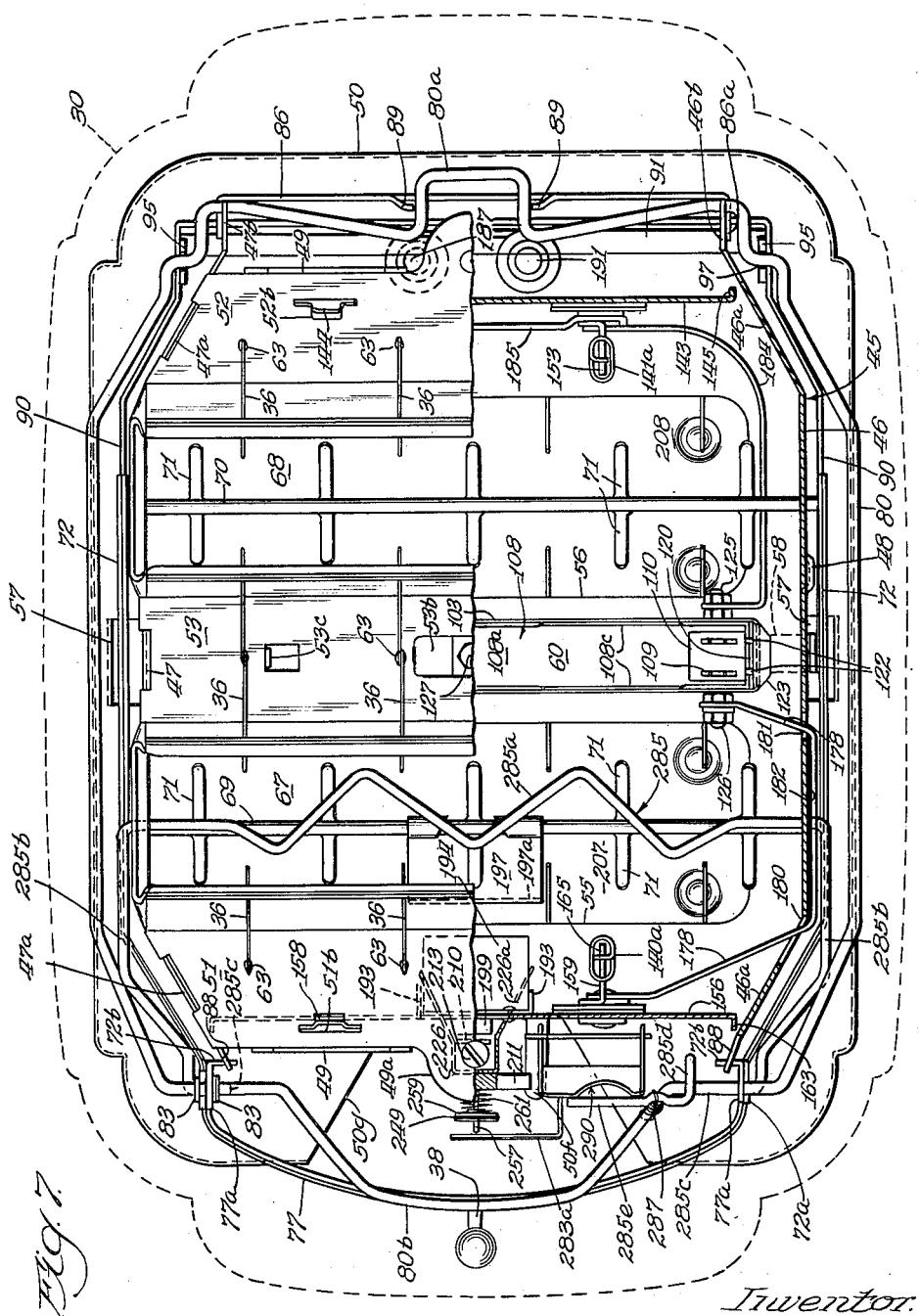
Fig. 7 is a top plan view with substantially one half thereof shown in section taken on line 7—7 of Fig. 5.

The vertical guide wires 36 referred to above extend through openings 62 in the U-shaped top frame plates 51, 52 and 53 with the upper ends thereof suitably fastened thereto as by welding indicated at 63 in Fig. 7 of the drawings. The lower ends of the guide wires are provided with hooked portions for engaging spaced notches 64 cut into depending flanges 65 and 66 surrounding the openings 55 and 56 respectively. The notches 64 along one side of depending flange 66 are clearly shown in Fig. 8 of the drawings. The vertical guide wires 36 actually define the toasting chambers designated as 67 and 68 which are accessible through the slots 34 and 35 respectively in the shell 26 between the center top frame plate 53 and the end top frame plates 51 and 52 respectively.

Solely for the purposes of simplifying the ensuing description the end of the automatic toaster 25 adjacent the end top frame plate 51 is designated as the thermostat end, while the end adjacent the end top frame plate 52 is designated as the cord end. The reason for these designations will be obvious from the following description. It should be understood that the thermostat or other control device employed and power cord could be disposed at either end of the toaster or at the same end for that matter.

BREAD CARRIAGE MECHANISM

It will be understood that in any automatic toaster, means must be provided not only for supporting the material to be toasted, usually bread slices, in the toasting position but also for moving the material to be toasted from a toast receiving position to a toasting position and upon the completion of the toasting operation back to the toast receiving position so that the toast may readily be removed. To this end, there are disposed in the toasting chambers 67 and 68 (Fig. 7 of the drawings) a pair of horizontally disposed vertically movable bread racks or supports 69 and 70, the bread rack 69 being disposed in the toasting chamber 67 while the bread rack 70 is disposed in the toasting chamber 68. Essentially, the toast racks 69 and 70 comprise central rod-like supporting members, extending transversely of the toasting chambers 67 and 68, respectively. These rod-like members are illustrated as supporting a plurality of V-shaped fingers 71 disposed in spaced relationship with the open ends of each V extending upwardly so as to tend to center the sliced material being toasted regardless of the thickness of the slice which can readily be accommodated between the guide wires 36.

For the purpose of relating the bread racks 69 and 70 into a unitary structure, there are provided along the outside of the frame 45 and substantially parallel with the side frame plates 46 and 47 a pair of horizontally disposed bread rack side arms 72. Each of the ends of the bread racks 69 and 70 are adapted to extend beyond the side frame plates 46 and 47 which are provided with substantially vertically extending slots 74 and 75 for the purpose. As illustrated the ends of the bread rack 69 extend outside the frame 45 through the vertical slots 74 while the ends of the bread rack 70 extend outside the frame 45 through the vertical slots 75. These slots 74 and 75 extend to the bottom of the side frame plates 46 and 47, such that the bread racks 69 and 70 which have their ends fastened to spaced points on the side arms 72, as by spot welding or the like, may be assembled and inserted into the slots 74 and 75 before the sub-base 50 is attached to the side frame plates 46 and 47. The slots 74 and 75 are illustrated as being slightly curved to accommodate the movement of the bread carriage including the bread racks 69 and 70. The slots 74 furthermore extend much closer to the tops of the side frame plates 46 and 47 than the slots 75 to accommodate certain control mechanism described hereinafter.

In order to form a rigid unitary bread carriage the ends of the rack side arms 72 adjacent the thermostat end of the automatic toaster 25 which is remote from the slot 75, are interconnected by a bread rack yoke 77 suitably fastened thereto by any suitable means such as the screws 78. As illustrated each of the ends of the side arms 72 connected to the yoke 77 is provided with an integral cross member 72a so as to form with the associated side arm a somewhat T-shaped member. Similarly the ends of the bread rack yoke 77 are provided with integral cross members 77a which interfit with the cross members 72a to provide at each end of the bread rack yoke 77 three vertical spaced openings.

It will be understood that by employing the interfitting cross members 72a and 77a that assembly therewith of elements disposed in such vertically spaced openings is greatly facilitated.

It will furthermore be understood that the bread carriage comprising members 69, 70, 71, 72, 77 and 78, and generally designated by the reference numeral 79, should be maintained in a substantially horizontal position so that the bread racks 69 and 70 are maintained in substantially the same horizontal plane at all times. In order to guide and support the carriage 79 for vertical movement while maintaining the bread carriage 79 in a horizontal plane there are provided two pairs of pivotally mounted parallel motion arms 80 and 81 of substantially identical configuration which are pivoted to the frame 45 at the cord end of the automatic toaster 25 and connected to the bread carriage 79 at the thermostat end of the toaster.

As illustrated, each pair of the parallel motion arms 80 and 81 are in the form of a closed loop of wire completely surrounding the frame 45, and having a particular configuration closely conforming to the frame cross section clearly shown in Fig. 7 of the drawings.

To pivotally support the parallel motion arms 81 and 82 at the cord end of the automatic toaster the angular extensions 46a and 47a of the side frame plates 46 and 47 are each provided with projections 46b and 47b extending beyond the end top frame plate 52 which projections are disposed in spaced parallel relationship. The vertical edges of the projections 46b and 47b each are provided with vertically spaced notches 83 and 84 for pivotally supporting the parallel motion arms 80 and 81, the notches 83 being adapted to receive portions of the arms 80 while the notches 84 are adapted to receive portions of the arms 81. For the purpose of maintaining the parallel motion arms 80 and 81 in their respective notches 83 and 84 and at the same time strengthen the frame 45 by interconnecting the side frame plates 46 and 47 at the cord end thereof, there is provided a frame cross yoke 86. This yoke 86 is suitably fastened by means of self-tapping screws 87 engaging lateral tabs 86a, integrally formed from the frame cross yoke 86, and the projections 46b and 47b. In order to limit sidewise movement of the parallel motion, arms 81 and 82 within the notches 83 and 84 each arm is provided at its pivotally mounted end between the notches 83 and 84 with a small U-shaped bend designated as 80a for the loop 80 and similarly as 81a for the loop 81. These U-shaped bends 80a and 81a are disposed in notches cut in the upper and lower edges respectively of the cross frame member 86 near the center thereof. The vertical edges of these notches are formed into ears 89 clearly shown in Fig. 7 of the drawings, to engage with either side of the U-shaped bends 80a and 81a, respectively, thereby limiting sidewise movement thereof. This arrangement tends to reduce bearing friction due to pivotal mounting of the parallel motion arms 80 and 81 since the ears 89 are bent so as to engage the U-shaped bends 80a and 81a at points coaxial with the bearing points of the arms 80 and 81 in notches 83 and 84, respectively.

Preferably the parallel motion arms 80 and 81 are originally formed into closed loops from suitable wire stock and at the junction of the ends of each loop there are provided a pair of spaced washers 83 indicated at one side of the cross portions thereof near the thermostat end of the toaster 25. These thermostat end cross portions designated as 80b and 81b respectively for the parallel motion arms 80 and 81 respectively are bowed sufficiently to clear any mechanism at the thermostat end of the toaster in moving from the position shown in Fig. 3 to the position shown in Fig. 4 of the drawings. The parallel motion arms 80 and 81 are pivotally related to the bread carriage 79 by extending through the uppermost and lowermost openings respectively of the three vertically spaced openings, referred to above, defined by the interfitting cross members 72a and 77a. The washers 83 as is clearly shown in Figs. 3 and 7 of the drawings are disposed on either side of one set of interfitting cross members 72a and 77a to prevent other than relative pivotal movement between the bread carriage 79 and the parallel motion arms 80 and 81. From the above description it is apparent that by virtue of the parallel motion arms 80 and 81, the bread carriage 79 is constrained to move only in a vertical direction and the bread racks 69 and 70 are maintained in substantially the same horizontal plane throughout the motion thereof.

For the purpose of limiting the maximum motion of the bread carriage 79 so that the desired movement of approximately three inches of the bread racks to and from the toasting position is produced, the vertical cross members 72a are provided at their upper and lower ends with lateral projections 72b, the upper ones of which engage with suitable integral extensions or stops 88 projecting from the thermostat end of the side frame plates 46 and 47, respectively. The maximum downward movement is limited by the lower lateral projections 72b of the bread carriage 79 coming into engagement with the sub-base 50. The uppermost position of the bread carriage 79 is shown in Figs. 3 and 5 of the drawings where the stops 88 are engaged thereby. The lowermost position of the bread carriage is shown in Fig. 4 of the drawings where the sub-base 50 is engaged thereby.

MOTION MULTIPLYING MEANS

It will be understood that any suitable motive means for causing movement of the bread carriage 79 may be provided. Such means might comprise an electric motor such as is disclosed in the above mentioned Wright and Jepson patent, spring motive means or the like. As described in detail in the ensuing description there is provided a thermomotive means 60 which acts as the prime mover for the bread carriage 79. This thermomotive means 60 is capable of producing only a limited amount of movement of the lifter lever depressor bar 58 of the order of about one-eighth of an inch as will be described in detail hereinafter. In order to convert such limited vertical motion of the depressor bar 58 to the desired movement of the bread carriage 79 a suitable motion multiplying means is required to interconnect the depressor bar 58 and the bread carriage 79. As illustrated this mechanism comprises a U-shaped lifter lever 90 and a lifter lever yoke 91. The lifter lever 90 is preferably disposed so that the arms 90a of the U are in a generally horizontal position and are parallel with the side frame plates 46 and 47. Furthermore the bight of the U extends across the cord end of the frame 45 beneath the projections 46b and 47b. The arms 90a are preferably pivotally mounted at intermediate points thereon to the frame 45 by means of pivot pins 93 in the form of suitable screws, or the like. The ends of the arms 90a of the lifter lever 90 remote from the bight of the U are pivotally connected by means of a rivet 94 adapted to be engaged by upwardly extending hook shaped portions 58a of the depresser bar 58.

The lifter lever yoke 91 comprises a channel shaped cross member 91a extending across the cord end of the frame 45 beneath the projection 46b and 47b. Integrally formed with each end of the cross member 91a are vertically disposed links 95 the lower ends of which are pivotally connected by pivot pins 96 with the bight end of the U-shaped arms 90a of the lifter lever 90. The upper ends of the links 95 are provided with notches 97 for receiving therein portions 81c of the parallel motion arms 81, which are parallel with the cross member 91a, so as to be capable of raising the parallel motion arms 80 and 81 in response to upward movement of the links 95. Since the links 95 are capable of transmitting upwardly directed forces to the parallel motion arms 81 at points close to the notches 84 which pivotally support the arms 81, it is apparent that the forces are transmitted through very short lever arms and consequently a small vertical movement of the links 95 and consequently of the portions 81c of the arms 81 causes a much greater motion of ends of the arms 81 supporting the bread carriage 79. In a mechanism constructed in accordance with the present invention a motion multiplication of approximately twenty-two to one was obtained which means that a one-eighth inch vertical movement of the links 95 produces approximately three inches of movement of the bread carriage 79.

The employment of a means for producing such a large motion magnification calls for the application of a relatively large force to the depressor bar 58 to produce sufficient force at the bread carriage to move it against the stops 88 when supporting two slices of toast. The weight of the bread carriage will of course cause it to move to its lowermost position when not opposed by a force applied through the links 95 and the parallel motion arms 81. It is important therefore that the motion multiplying means described above be substantially frictionless. The friction free requirement is very important, since otherwise jumpy and erratic bread carriage motion results. It will be understood that due to the very high temperatures at which toasters operate, lubricated bearing points are entirely unsatisfactory, and it would furthermore be undesirable to require an operator to lubricate such bearing points periodically particularly since many of them are quite inaccessible. In accordance with the present invention friction has been reduced to an absolute minimum by completely eliminating all sliding friction at the bearing points and replacing it with rolling friction. To this end the lifter lever is provided with rectangular openings 99 and 101 (see Fig. 5) for the pivot pins 93 and 96, respectively, thereby providing flat bearing surfaces of sufficient length to permit the necessary limited rolling of the pivot pins relative to the cooperating flat surfaces. The effective flat surfaces of the rectangular openings 99 are the top surfaces, while the bottoms of the openings 101 provide the effective flat surfaces as is clearly shown in Fig. 5 of the drawings. The top engaging surfaces 100 of the hook shaped members 58a are flat as is clearly shown in Fig. 5 of the drawings. In addition, the notches 83 and 84 are provided with flat top surfaces of greater length than the diameter of the wire from which the parallel motion arms 80 and 81 are formed to permit rolling friction of the parallel motion arms 80 and 81 relative thereto. Also, the notches 97 in the links 95 are provided with flat surfaces at the bottom thereof which are substantially longer than the diameter of the engaging portions 81c of the parallel motion arms 81 to permit the desired rolling friction. In all of these cases the flat surfaces for insuring rolling friction are designed so as to be normal to the direction of bearing pressure. It will be understood that if when the toaster is first put into operation and by accident one or more of the bearing shafts are at the wrong end of the flats, sliding friction would occur until the shaft properly positions itself on the flat. After this initial sliding friction the pressure remains sufficiently high that the bearing shafts remain properly positioned on their respective flats, so that thereafter a pure rolling friction occurs at the bearings.

THERMOMOTIVE PRIME MOVER FOR BREAD CARRIAGE

As was mentioned above a suitable motive means for causing movement of the bread carriage 79 must be provided. Heretofore such means have comprised spring motors, electric motors, and the like. Since automatic toasters require large amounts of electrical energy to perform the toasting operation (1100 watts or more) it was thought desirable to take advantage of the thermomotive effect which can be produced by the expansion and contraction of a metal due to a change in temperature thereof. Although the efficiency of such an arrangement is always very low from the standpoint of converting electrical energy to mechanical energy, sufficient mechanical energy to produce the necessary bread carriage motion was found to be obtainable from the large electrical energy which of necessity is required to perform to toasting operation. Such thermomotive devices in the form of bimetallic elements have been suggested heretofore but have in general been quite unsatisfactory and of low energy conversion efficiency and have found no practical application in automatic toasters. This is due to several factors among which are the very great dissipation of heat in relation to temperature rise and the long time constant (time required to reach equilibrium temperature in heating up or cooling off). It is desired to have a relatively slow movement of the bread carriage during lowering and raising thereof as contrasted with an abrupt and noisy "pop-up" but such movement should still occur in a relatively short period of time. Consequently a satisfactory thermomotive device should provide the maximum efficiency obtainable and still have a short time constant to produce the desired movement of the bread carriage in a relatively short period of time. Such a short time constant can best be obtained with an arrangement wherein a substantial rise in temperature is occasioned with a very small energy input. In accordance with the present invention a series of spaced turns of wire having a small surface area and mechanically stressed in tension only were found to produce a very satisfactory thermomotive device for converting electrical energy in the form of current flowing therethrough to mechanical energy by virtue of the expansion of the wire loop or turns. Such a wire has a low dissipation factor and undergoes a large rise in temperature with a small heat input. Furthermore all parts thereof contribute equally to the mechanical work which can be obtained. Unfortunately the actual motion obtainable with such a wire even with a large temperature rise is relatively small and in accordance with the present invention an efficient and reliable motion multiplying means is provided, whereby the thermomotive device 60 produces the necessary movement of the depressor bar 58. Referring now to Fig. 8 of the drawings there is illustrated the thermomotive device 60 comprising a plurality of spaced turns of a nickel chromium wire generally designated as 103. For the purpose of multiplying the motion produced by virtue of the change in length of the different turns or loops of the wire 103 when heated by current flow therethrough the thermomotive device 60 comprises an expansible support in the form of spaced insulated vertical structures around which the turns of the resistance wire 103 are wound, which structures in turn are supported by specially shaped yokes or trusses formed from thin stainless steel spring stock. As illustrated the spaced vertical structures comprise a pair of channel or U-shaped strut members 106 disposed with the closed ends or bights of the U towards each other. These vertical strut members are provided with openings 107 in order to make them as light as possible without appreciably reducing the rigidity thereof. The upper ends of the struts 106 are interconnected by a V-shaped truss or yoke 108 having a relatively shallow angle, i. e. the angle defining the V is approximately 150°. As a consequence a very small change in the lengths of the loops of the resistance wire 103 due to expansion under the application of heat, permits a relatively large vertical motion of the center of the truss or yoke 108 even though the ends thereof move very slightly in a horizontal direction. The V-shaped truss 108 is designed with an unflanged relatively horizontal central portion 108a and unflanged horizontal end portions 108b. These portions 108a and 108b are interconnected by flanged angular portions 108c as is clearly shown in the Figs. 7 and 8 of the drawings. Flexing or bending of the truss 108 can therefore only occur in the unflanged central portion 108a or the unflanged end portions 108b. The truss 108 due to the weight of the bread carriage inherently tends to straighten out and continually exerts a force tending to separate the strut members 106 which action is restrained by the turns of the resistance wire 103.

In order to connect the upper ends of the struts 106 with the ends 108b of the truss or V-shaped yoke 108 the struts 106 are provided with integral extensions 109 which extend through suitable openings defined in the ends 108a of the truss 108 and through openings in truss washers 110, which extensions 109 are peened over as indicated thereby fixedly to interrelate the struts 106 and the truss 108.

In order further to multiply the limited relative movement of the struts 106 by virtue of the expansion and contraction of the resistance wire 103, the lower ends of the struts 106 are similarly interconnected by two spaced trusses 112 and 113 which are very similar to the truss 108. Two trusses are employed to prevent skewing of the frame defined by the struts 106 and the trusses 108, 112 and 113 under the tensile force due to the resistance wire 103 wound thereon. As illustrated, the lower ends of the struts 106 are provided with sufficiently long projections 114 to extend through suitable openings in the horizontal unflanged ends of the trusses 112 and 113 as well as through washers 115a and spacers 115b. The ends of the projections 114 are peened over fixedly to interrelate the ends of the trusses 112 and 113 with the lower ends of the struts 106. The trusses 112 and 113 are provided with unflanged central portions supporting a center adjusting screw bushing 116 and flanged intermediate portions substantially identical with the truss 108. A suitable truss spacer 117 maintains the central portions of the trusses 112 and 113 in spaced relationship. In one arrangement constructed in accordance with the present invention, the yoke 108 was designed so that the horizontal ends 108b thereof were displaced vertically from the center portion 108a by substantially three-eighths of an inch when the resistance wire 103 was cold, thereby affording the above mentioned very shallow angle. Under the same conditions, in a construction embodying the present invention, the ends of the yokes 112 and 113 were disposed vertically above the central portions thereof by substantially five-sixteenths of an inch.

In addition to the double truss arrangement at the lower ends of the strips 106 which prevent skewing in one direction of the frame of the thermomotive device 60 (comprising the struts 106 and the trusses 108, 112 and 113), the upper end of one strut 106 is connected by means of a suitable tension wire 118 with the lower end of the other strut 106 to prevent skewing in another direction. The ends of this diagonally disposed wire 118 may be hook-shaped to engage suitable slots defined in the upper and lower ends of the bights of the U-shaped struts 106 as is clearly indicated in Fig. 8 of the drawings.

To properly support the turns of the resistor wire 103 in the form of a spiral on the frame of thermomotive device, in spaced relationship and insulated from the frame there are provided on each side of the frame two vertically disposed insulating strips 120 and 121 which are provided with suitable notches for receiving integral extensions 122 of the struts 106 to prevent vertical movement of the strips 120 and 121 relative to the struts 106. Movement thereof in any other direction is prevented by the turns of the resistance wire 103 wound thereabout. The insulating strips 120 may be designated as the clip insulators for insulating a plurality of wire receiving clips 123 from the struts 106. The wire receiving clips 123 are preferably supported in vertically spaced notches defined in the insulating strips 121. The wire receiving clips 123 are U-shaped and maintain the individual turns of the resistance wire 103 in properly spaced relationship relative to each other. The turns of the wire 103 also aid in holding the clips 123 in position in the notches defined in the insulating strips 121.

The lower end of the resistance wire 103 is suitably fastened to a terminal bolt 125 which extends through the lower end of one of the struts 106 whereby suitable electrical connection can be made therewith. Similarly, the upper end of the resistor wire 103 is connected to a suitable terminal bolt 126 extending through the upper end of one of the struts 106 whereby electrical conection can be made thereto. As illustrated, the ends of the resistance wire 103 are disposed within suitable slots provided in the heads of the terminal bolts 125 and 126 respectively and brazed or soldered thereto.

It should be understood that the thermotive device 60 may be supported in any suitable place within the automatic toaster 25 so that the relative movement between the central portions 108a and 112a of the trusses 108 and 112 may be transmitted to the depressor bar 58. If this depressor bar 58 is located near the center of the toaster as illustrated then the thermomotive device must preferably also be located centrally of the toaster. It will be apparent however that the depressor bar 58 might equally well be disposed near one end of the toaster as for example the cord end in which case the thermomotive device 60 could also be disposed at such end. The electrical energy required to heat the resistance wire 103 of the thermomotive device 60 is wasted except for the mechanical work obtained in producing relative movement of the centers of the trusses 108 and 112. On the other hand no mechanical work is obtained from the toasting elements employed in conventional automatic toasters which ordinarily use 1100 or more watts of electrical energy. In the copending Loomer application, Serial No. 11,646, filed February 27, 1948, now Patent No. 2,590,334 and assigned to the same assignee as the present application, there is disclosed and claimed an arrangement in which the thermomotive device of the present invention with minor changes also functions as one of the toasting elements of the automatic toaster. This is very desirable since the high electrical energy required for toasting is more than sufficient to produce the desired mechanical work of the thermomotive device. Accordingly the thermomotive device of the present invention has been illustrated in this preferred embodiment whereby the resistor wire 103 also acts as the center heating element of the automatic toaster 25 disposed between the toasting chambers 67 and 68. To this end, the central portion 108a of the truss 108 is rigidly fastened as by means of a bolt 127 to the center top frame plate 53. So that the flanged portions 108c of the yoke 108 do not interfere with the center top frame plate 53, the frame plate 53 is provided with a central depression 53b to which the bolt 127 is fastened. The center top frame plate 53 is furthermore provided with depending projections 53c preferably punched therefrom as is clearly shown in Figs. 7 and 8 of the drawings. These projections 53c are adapted to engage the ends 108a of the yoke or truss 108 to limit their maximum upward movement and consequently prevent the yoke 108 from snapping over center. With this arrangement the center 108a of the truss 108 is fixed and consequently all movement occurs at the bushing 116. In order to depress the depressor bar 58 there is provided a stud or center adjusting screw 128 threadedly engaged with the bushing 116. This stud is provided adjacent its lower end with a shoulder 129 engaging the depressor bar 58 and including a slotted projection 130 extending through a suitable opening defined in the depressor bar 58. By means of the stud 128, suitable adjustment of the motion transmitted to the depressor bar 58 by the thermomotive device 60 may be controlled.

If the thermoomtive device 60 is also employed as the center heating element then preferably a center element barrier plate is provided to confine a portion of the heat produced by the resistor wire 103 to each of the toasting chambers 67 and 68 in case a single slice is being toasted. Such a barrier plate may comprise two very thin reflector plates 131, one disposed on either side of the wire 118 which may be used to support the same. If desired an additional wire 132 may extend diagonally between the reflector plates 131 as clearly indicated in Fig. 8 of the drawings, to better support the barrier plate. The ends of the wire 132 may extend into notches in the bights of the U-shaped struts 106 adjacent the ends thereof similar to the notches for receiving the hook shaped ends of the wire 118. The center element barrier plate 131 has no function as far as the thermomotive device of the invention is concerned but is employed only when the thermotmotive device also acts as the center heating element. Where the resistance wire 103 of the thermomotive device 60 is employed also as a toasting element the turns of wire near the bottom are spaced more closely than at the top as is clearly illustrated in Fig. 8 of the drawings in order to obtain more uniform toasting. This is necessary because of the fact that the bread slices are heated by convection as well as by radiation.

The operation of the thermomotive device 60 of the present invention with respect to the bread carriage 79 will be understood in view of the detailed description included above. When current flows through the resistor or heater wire 103 it is heated and expands thereby permitting the struts 106 to move apart slightly. Such movement of the struts 106 causes a relatively large upward movement of the shoulder 129 of the stud or center adjusting screw 128 due to the inherent tendency of the trusses or yokes 108, 112 and 113 to try to straighten out. In an arrangement constructed in accordance with the present invention movement of the shoulder 129 in response to change in length of each loop or turn of the resistance wire 103 was about eight times greater than such change in length. Upward movement of the shoulder 129 frees the depressor bar 58 whereupon it is permitted to move under the weight of the bread carriage 79 and any toast supported thereon until movement of the carriage 79 is stopped by the sub-base 50. When the current flow through the resistor wire 103 is cut off the wire cools and contracts so as to move the struts 106 toward each other slightly. The shoulder 129 of the center adjusting screw 128 is furthermore moved downwardly and consequently forces the depressor bar 58 to move downwardly with the result that the bread carriage 79 is moved against the upper stops 88, whereupon the toast supported thereon can readily be removed.

It will be understood that the tensile strength of nickel-chrome wire, from which the resistor wire 103 is preferably formed, is substantially less at high temperatures than when cold, and consequently it is essential that when the resistance wire 103 reaches a high temperature that substantially no tensile force is applied thereto. This is accomplished by so designing the resistance wire 103 relative to the thermomotive device 60 that a substantial expansion thereof occurs after the bread carriage has moved to the position shown in Fig. 4 of the drawings against the sub-base 50. In a thermomotive device constructed in accordance with the present invention, all tensile stress was removed from the resistance wire 103 when the temperature thereof reached approximately 1100° F., although it ultimately reached an equilibrium temperature of between 1500°–1600° F. With this arrangement the elastic limit of the resistance wire 103 was not exceeded.

By employing the resistor wire 103 of the thermomotive device 60 in a dual capacity both as a toasting or heating element as well as the means for producing mechanical work as is claimed in the above mentioned copending Loomer application, adequate lifting power for the bread rack 79 is provided without requiring any additional expenditure for electrical power. Furthermore the mechanical arrangement is relatively simple and to a large degree is self-compensating for variations in manufacture. Thus, if one loop of the spirally wound resistor wire 103 happens to be wound tighter than the remainder and as a consequence assumes more than its share of stress, it will yield as that stress becomes excessive and transfer some of it to the other loops of the wire. Actually the thermomotive device 60 is designed to provide for two and one half to three times as much movement as is actually used. The main reason for this is to provide a reasonably rapid and uniform rate of movement of the bread carriage 79. A second reason is to free the loops of the wire 103 of stress after their temperature exceeds what is considered a safe limit of between 1100° to 1200° F. When current is passed through the heater wire 103, its temperature rises with time approximately in accordance with the exponential law:

$$T = T_f(1 - e^{-kt})$$

Also in cooling the temperature varies approximately in accordance with the following expression;

$$T = T_f e^{-kt}$$

where T represents the instantaneous value of temperature, $T_f$ represents the equilibrium high temperature (both such temperatures being relative to the surrounding or ambient temperature), $e$ is the natural logarithmic base, $t$ represents time and $k$ is a constant. Actually the temperature rise departs somewhat from that indicated by the above equations because of the fourth power relationship between absolute temperature and heat dissipated as radiant energy.

Figure 21:
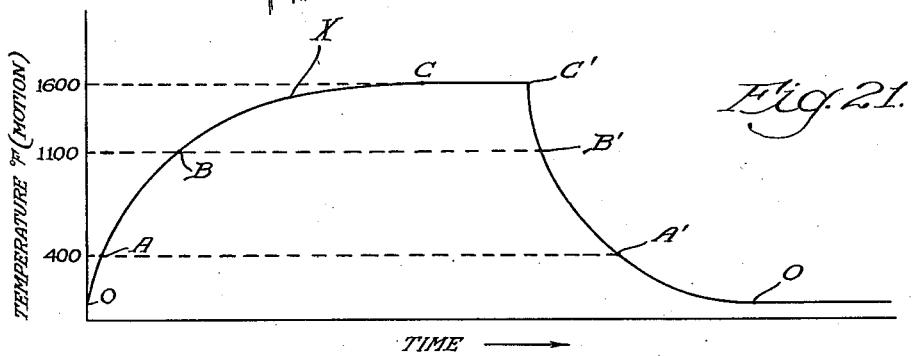
Fig. 21 is a curve diagram to aid in understanding the operation of the automatic toaster of the present invention.

On the fairly accurate assumption that an exponential law is substantially followed, reference may be had to Fig. 21 of the drawings where there is illustrated a curve diagram X in which the temperature rise and fall of the resistance wire 103 is plotted with respect to time. It is also assumed that the expansion coefficient of the resistance wire 103 is uniform within the range of temperatures that the wire is subjected to and that the motion multiplication factor remains constant. On these assumptions the curve X of Fig. 21 indicates not only the temperature change of the resistor wire 103 with time but also the corresponding available motion of the bread carriage 79 with respect to time. Referring now to the curve diagram Fig. 21 it may be noted that the available movement of the carriage 79 upon heating of the resistor wire 103 is represented by the vertical distance from O to C. The actually used movement in a properly adjusted thermomotive device such as 60 is represented by the vertical distance from A to B. It is apparent at once, therefore, that the time allowed for the bread carrier to move from a position corresponding to A to a position corresponding to B is very much less than the time required for heating the element 103 from room temperature to a temperature approaching its final temperature. Further in the range from A to B the temperature rise approaches a straight line relationship which means that the rate of rise and consequently the velocity of movement is substantially uniform in this range whereupon the bread slice is caused to move at a uniform rate of speed within the actual range of motion. As a result of all this, when the resistance wire 103 heats up during the period represented by the range from O to A in Fig. 21 of the drawings, the net result is simply a gradual release of the pressure of the bread carriage 79 against the stops 88. As the temperature of the resistance wire 103 passes beyond the point A of the curve X downward movement of the bread carriage 79 results. When the resistance wire 103 reaches a temperature of the order of 1100° F. the bread carriage 79 engages the sub-base 50 which limits its maximum downward movement so that subsequent heating of the resistor wire 103 causes the individual turns to expand thereby removing any stress on them due to the weight of the bread carriage and the bread slices being toasted since this weight is supported by the sub-base 50 which is now engaged by the bread carriage. The point C in Fig. 21 represents the final temperature of about 1600° F. and in this highest range of temperature from 1100 to 1600° the resistance wire 103 is under no more longitudinal stress than in any conventional toasting element.

Upon cooling of the resistor wire 103 from the point C' to B' of the curve X no resultant movement of the bread carriage 79 occurs and it continues to engage its lower limit stop, namely the sub-base 50. As is obvious from the curve of Fig. 21 the time of cooling during this range is very short so as to be substantially negligible. At the point B' the resistance 103 has cooled and contracted sufficiently to begin to encounter the stress applied through the yokes 112, 113 and 108 and the struts 106 of the weight of the bread carriage 79 and the bread slices carried thereby, and from B' to A' the contraction of the resistor wire 103 causes relative separation of the center points of the trusses or yokes 108 and 112, with the result that the depressor bar 58 is moved downwardly to lift the bread carriage 79 and associated bread slices from the position shown in Fig. 4 of the drawings to the position shown in Fig. 3. From the point A' to O the resistance wire 103 cools still further and more slowly as is clearly indicated by the curve X but no further movement of the bread carriage 79 results since such movement is prevented by the stops 88. Instead further contraction, at these relatively low temperatures, of the resistance wire 103 serves to increase the pressure of the bread carriage 79 against its upper stops 88. This pressure involves the application of a considerably greater stress on the resistance wire than that due to the weight of the bread carriage alone. This pressure may be adjusted by means of the center adjusting screw 128 and it should at least equal the weight of two bread slices of the largest size which could be accommodated by the automatic toaster 25 so that when such bread slices are placed on the bread carriage 79 sufficient force will still be present to hold the bread carriage against the stops 88 until the thermomotive device 60 functions to permit movement to the toasting position.

It will be understood that if someone were to forcibly depress the bread carriage 79 while the heater wire 103 was cold that an increased stress would be applied thereto. If desirable a suitable relief spring could be provided to relieve such additional stress on the wires. However, this has been found to be unnecessary due to the high resilience of the structure, especially in the parallel motion arms 80, and 81 whereupon such additional stress is only partially transmitted to the turns of the resistance wire 103 even under such abnormal conditions. Furthermore at these low temperatures (room temperature) the resistance wire 103 is able to withstand much higher stresses than when heated well above 1100° F. If for example the toaster were incorrectly adjusted at the factory so that the bread carrier motion is shifted from its proper range A—B to the higher temperature portion of the curve X of Fig. 21 of the drawings whereby an excessive stress would be applied to the resistance wire 103 when hot, this condition would automatically correct itself. Such stress, if excessive, would cause the wire 103 to yield slightly, and in so yielding, will bring the useful portion of the curve within the range A—B where it belongs.

The stress on the resistor wire 103 can be further reduced by applying a tension spring between the sub-base 50 and the U-shaped bend 81a of the parallel motion arms 81. This spring if properly designed can be made to partially offset the weight of the bread carriage and associated parts. In an arrangement constructed in accordance with the present invention and designed for 115-volt operation, it was found that the stress due to the weight of the bread carriage 79 was sufficiently below the safe value of stress on the wire 103 so that the spring mentioned above was unnecessary. However in designing a model for higher voltages, as for instance 220 volts, where the heating element must of necessity be of much smaller cross section, it may be necessary to add such a tension spring.

*Specially shaped dual linear heat sources*

From the above discussion it is apparent that the resistor wire 103 also functions as a center heating element for toasting one side of any bread slices disposed in the toasting chambers 67 and 68. To toast the other sides of the bread slices, so called "end toasting elements" are conventionally provided which would be disposed at the thermostat end and the cord end of the toaster adjacent the toasting chambers 67 and 68 respectively. Before describing the end toasting elements of the present invention, attention is directed to the fact that the automatic toaster 25 employs the radiation control principle of the above mentioned copending Koci application whereby a thermoresponsive device is dependent upon the surface temperature of a substantial area of the bread surface being toasted. The present invention contemplates collecting a large amount of radiation emitted from a substantial area of the bread surface being toasted and applying the same to a bimetallic element or the like without permitting such bimetallic element or thermostat to receive any heat energy radiated from the toasting elements. It has been observed that the total radiant energy emitted from the bread surface by virtue of its temperature rise is relatively small and the radiant power is measured in milliwatts, and also that for reliable operation on this principle it is necessary to collect and direct as large an amount of this energy as possible on the thermal control element. Consequently conventional toasting elements such as the resistance wire 103 associated with the thermomotive device 60 can not be employed since it would be difficult to provide an arrangement whereby direct radiation therefrom is not received by the bimetallic element and still wherein the heat energy radiated from a large surface area of the bread surface being toasted is supplied to the element. Accordingly it is necessary to provide an end toasting element for the thermostat end of the toaster 25 which provides uniform toasting over the entire bread surface while still permitting a large amount of radiation from a substantial area of the bread surface being toasted to reach the thermal control device disposed at the thermostat end of the toaster without permitting direct radiation from such end toasting element to reach said device.

Since it is conventional in automatic toasters to control the toasting operation of a two slice toaster in dependence upon the actual conditions affecting only one of the two slices this feature is embodied in the automatic toaster of the present invention. Consequently when only a single bread slice is to be toasted it must be inserted in the toasting chamber 67 adjacent the thermostat end of the toaster. If a single slice is toasted and inserted in chamber 68, nothing will happen so the operator will immediately become aware of the fact that it should be inserted in the other toasting chamber. With such an arrangement it will be apparent that only one of the end toasting elements, namely the one at the thermostat end, need be of the special construction referred to above and described in detail hereinafter. As illustrated in the drawings however, substantially identical end heating units are provided primarily to reduce the number of different parts required since as will be understood from the above discussion the central heating element is of necessity of special construction.

In accordance with the present invention, and as disclosed and claimed in a divisional application now Patent No. 2,590,328, the end heating units each include a pair of linear heat sources comprising spaced apart vertically disposed resistor elements so as to afford a substantial area therebetween to permit heat radiated from the surface of the bread slice being toasted to reach a suitable thermal responsive control device. As illustrated the two heating elements of each end heating unit are identical and for reasons described in greater detail hereinafter comprise a resistor wire wound in the form of an elliptical spiral about a core of strip insulating material with the narrow diameter of the elliptical spiral being disposed parallel to the bread slices and consequently the toasting chambers 67 and 68. The heating elements of the thermostat end toasting unit are designated as 140a and 140b respectively while the heating elements of the cord end toasting unit are designated as 141a and 141b respectively. These heating elements are designated schematically in Fig. 19 of the drawings and are shown in detail in Figs. 7, 15, 16, 17 and 18.

For the purpose of supporting the heating elements 140a, 140b, 141a and 141b of the end heating units, each end heating unit is in the form of a unitary assembly comprising in addition to the heating elements suitable supporting and reflecting devices. Considering first the cord end heating unit generally designated in Fig. 15 of the drawings by the reference numeral 142, it may be noted that it comprises in addition to the heating elements 141a and 141b a combined reflector and support 143 whose effective reflector surface is a plane surface. Preferably the reflector 143 is formed of bright rolled aluminum or the like and is provided with a pair of spaced integral downwardly extending projections 143a at the lower edge thereof and similar integral upwardly extending projections 144 at the upper end thereof. In order to provide sufficient strength the reflector 143 is preferably provided with vertically extending flanges 145 at the edges thereof and horizontally extending ribs 146 adjacent the upper and lower horizontal edges thereof which ribs preferably include extensions into the projections 143a and 144 as is clearly shown in the drawings.

To support the reflector 143 at the cord end of the automatic toaster 25 parallel to the toasting chamber 68, the sub-base 50 is preferably provided with suitable openings 50c to receive the projections 143. Similarly the cross top frame plate 52 is provided with openings 52b (see Fig. 7 of the drawings) for receiving the projections 144. With this arrangement it will be apparent that the heating elements 141a and 141b are suitably supported from the reflector 143 and the heating unit 142 is firmly supported by the toaster frame adjacent the toasting chamber 68. Although the heating elements 141a and 141b and similarly the heating elements 140a and 140b are illustrated as being vertically disposed, they could equally well be disposed in horizontal planes and still provide the necessary space therebetween for permitting heat energy radiated from the surface of the bread slice being toasted to reach the thermal responsive device while permitting the employment of simple means for preventing the radiant energy from the heating elements themselves from reaching the thermal responsive device. The vertical disposition of the heating elements is believed to be preferable in that they are less likely to provide a ledge for catching crumbs and also they readily permit variation in spacing between adjacent turns to provide for convection heat transfer which is always present when the elements are spaced from the material to be heated. For this reason the vertical arrangement is disclosed in the drawings and furthermore the heating elements 140a, 140b, 141a and 141b have the lowermost turns thereof spaced more closely together than the upper turns as is clearly shown in Figs. 15 to 18 of the drawings, in a manner similar to the center heating element 103 disclosed in Fig. 8 of the drawings.

In order to support the heating element 141a a pair of brackets 148 are provided spaced vertically from each other and suitably riveted to the reflector 143 by means of rivets 149. Since the brackets 148 are preferably employed both as a mechanical support for the heating element associated therewith as well as electrical connections for the terminals thereof, suitable insulating washers and bushing arrangements 150 and 151 are provided as is clearly shown in Fig. 16 of the drawings. Identical brackets 148 and fastening means therefor are provided for the heating element 141b. The ends of the heating elements 141a and 141b are preferably bent into the form of hooks which are hooked over the brackets 148 as is clearly shown in Fig. 16 of the drawings and are preferably spot welded thereto to insure proper mechanical support as well as satisfactory electrical connection thereto.

In order that the reflector 143 may be effective uniformly to reflect heat energy radiated from the entire vertical extent of the heating elements 141a and 141b, it is desirable that the heating elements be uniformly spaced from the reflector. To insure such uniform spacing there is preferably disposed within the turns of the heating elements 141a and 141b a suitable core in the form of a strip of insulating material 153 with the narrow dimension of the strip being directed toward the reflector 143. This strip will prevent bending of the heating elements in a direction toward and away from the reflector 143. Bending of the elements 141a and 141b in the other direction will not adversely affect the heating thereof in the same manner as bending in the direction prevented by the strips 153. These elements 141a and 141b may be initially wound on this strip to present the spiral winding of elliptical cross section.

The heating elements 140a and 140b associated with the thermostat end heating unit generally designated at 155 in Fig. 17 of the drawings is substantially identical with the heating unit 142 and comprises a similar plane reflector 156 having downwardly extending projections 157 engageable with openings 50d defined in the subbase 50 and projections 158 at the upper end thereof engageable with openings 51b in the top cross frame member 51. Suitable brackets 159 identical with the brackets 148 are fastened in an insulated manner to the reflector 156 by means of rivets 160 and insulating washers 161 and 162. The reflector 156 is furthermore provided with vertical flanges 163 to give strength and rigidity thereto and in addition suitable horizontal ribs 164 are provided adjacent the upper and lower edges thereof which have extensions leading into the projections 157 and 158. Each of the heating elements 140a and 140b preferably is wound on a core 165 in the form of an insulating strip identical with the insulating strips 153 described in connection with the heating unit assembly 142. Substantially the only difference between the heating unit assemblies 142 and 155 resides in the design of the reflector 156 of the heating unit assembly 155 which includes a rectangular opening 168 therein between the heating elements 140a and 140b which, as will become apparent from the following description, provides a window of relatively large opening for collecting the energy radiated from the surface of the bread slice being toasted in the toasting chamber 67 and direct it to the main portion of the thermostat. The means for preventing radiant energy from the heating elements 140a and 140b or the central heating element 103 from reaching the thermostat end of the toaster 25 and affecting the thermal responsive device associated therewith will be described in greater detail hereinafter although they are preferably associated with the reflector 156.

1. *Electrical circuit*

It will be understood that any suitable means of supplying electrical energy to the heating elements 103, 140a, 140b, 141a, and 141b may be provided. These individual heating elements may be connected in parallel, in series or in some sort of series-parallel combination. The particular manner of supplying them with electrical energy may best be understood by reference to Fig. 19 of the drawings where the heating elements are schematically illustrated and designated by the same reference numerals as in the structural figures of the drawings. As illustrated the heating elements are all connected in series with one another and to a suitable source of power through a conventional appliance cord 170 which includes the well-known plug connector 171 for connection to any suitable electrical outlet. As illustrated in Fig. 19 of the drawings the electrical circuit comprises in addition to the heating elements a single control switch generally designated as 172 and comprising relatively movable contacts 173 and 174 to be described in greater detail hereinafter. When the contacts of the control switch 172 are open the circuit through the serially arranged heating elements is interrupted. Conversely, when the switch 172 is closed the circuit through the serially arranged heating elements is closed and if the plug connector 171 is connected to a suitable source of energy, current will flow through the heating elements in a well understood manner. Because it is not common practice to supply direct current as the source of electrical energy, and because of the added cost of a structure having a switch suitable for both alternating and direct current operation the illustrated embodiment includes a switch suitable for alternating current only.

For the purpose of serially interconnecting the various heating elements, suitable bus bars are provided which are preferably disposed in the automatic toaster so as to be suitably spaced from any adjacent conducting portions for satisfactory insulation therefrom and furthermore so as not to interfere with any of the moving parts of the toaster as well as to be free of the toasting chambers and the like. To this end the upper end of the toasting element 140b is connected by means of a suitable bus bar 176 with one terminal of the switch 172 to be described in greater detail hereinafter. Preferably the bus bar 176 is connected to the upper bracket 159 associated with the heating element 140b by means of the same rivet 160 that supports the bracket from the reflector 156. The lower ends of the heating elements 140a and 140b are interconnected by means of a bus bar 177 as is clearly shown in Figs. 17 and 18 of the drawings. To interconnect the upper end of the heating element 140a and the upper end of resistor wire 103 there is provided a suitable bus bar 178 having one end thereof suitably connected by means of the rivet 160 to the upper end of the heating element 140a and the other end suitably connected to the terminal bolt 126 as is clearly indicated in Figs. 7 and 8 of the drawings. It will be understood that since the bus bar 178 is disposed adjacent the upper end of the automatic toaster and extends from the thermostat end heating element to the central heating element, that means must be provided to prevent it from interfering with the insertion of bread slices into the toasting chamber 67. As illustrated the bus bar 178 has a substantial portion thereof where it passes the toasting chamber 67 disposed outside the side frame plate 46. To this end, suitable notches 180 and 181 are cut into the upper edge of the side frame plate 46 to permit the bus bar 178 to extend outside the frame plate and to return inside the frame plate as is very obvious from Figs. 5, 6 and 7 of the drawings. A suitable insulating strip 182 of mica or the like is disposed between the bus bar 178 and the side frame plate 46 to provide the desired electrical insulation.

The lower end of the heating element 102 is illustrated as being electrically interconnected by means of a bus bar 184 with the lower end of the heating element 141a. One end of the bus bar 184 is connected to the terminal bolt 125 of the resistor 103 while the other end is suitably connected by means of the rivet 149 with the bracket 148 and consequently the lower end of the heating element 141a. A suitable bus bar 185 interconnects the upper ends of the heating elements 141a and 141b. The lower end of the heating element 141b is connected by means of a lead bus bar 186 with a suitable terminal stud 187 supported by the sub-base 50 adjacent the cord end of the toaster. Preferably the sub-base 50 and the insulating base 30 are arranged to define an insulating chamber generally designated at 188 in Fig. 9 of the drawings. This insulating chamber is defined essentially by a cup shaped member integrally formed with the base 30 which includes an opening 189 to permit access of the appliance cord 170 thereto. The top or cover of the insulating recess 188 is defined by an insulating plate 190 fastened to the underside of the sub-base 50 by the mounting stud 187 and an additional mounting stud 191 which is clearly shown in Figs. 5, 6 and 7 of the drawings. One conductor of the appliance cord 170 is connected to the conductor stud 187 within the insulated chamber 188 and the other conductor of the appliance cord 170 is similarly connected to the conductor stud 191 also within the insulating chamber 188. To complete the electrical circuit from the conductor stud 191 to the terminal of the switch contact 174 there is provided a suitable insulated conductor 192. This insulated conductor 192 preferably extends outside the recess 188 through a suitable opening defined in one of the side walls of the recess 188. Preferably the conductor 192 is suitably supported along the edge of the base so as not to interfere with the operative parts of the toaster, since it must extend from the cord end of the toaster to the thermostat end as is illustrated in Figs. 3 and 4 of the drawings. For the purpose of relieving any strain which might be applied to the appliance cord 170 from adversely affecting the connections thereof to the terminal studs 187 and 191 a suitable strain relief 195 is provided which is, as illustrated in Fig. 5 of the drawings as riveted to the sub base 50 and clamped to the appliance cord 170.

2. *Theory underlying uniform heating by linear heat sources*

As was mentioned above the thermostat end heating unit 155 having two linear heat sources associated therewith very satisfactorily provides the necessary area therebetween for the rectangular opening 168 through which heat energy radiated from a substantial area of the surface of the bread slice disposed in the toasting chamber 67 may reach the control unit to be described hereinafter. However, in order to understand why the specially shaped linear heat sources of elliptical cross section are employed it might be pointed out that linear heat sources of circular cross section have been employed heretofore, and in this regard attention is directed to Jepson Patent 2,368,026 assigned to the same assignee as the present application. To obtain uniform toasting, however, the linear heat sources employed heretofore have required the use of specially shaped reflectors which might comprise parabolic, curved or compound curved surfaces. It will be understood that in such arrangements direct radiation from the linear heat sources themselves does not perform uniform toasting and the specially shaped reflectors are relied upon to supply the additional heat energy required at those places not satisfactorily heated from the toasting elements directly. If the reflection coefficient of the specially shaped reflectors remains constant at all times then such prior art arrangements would be entirely satisfactory. However, it is a well known fact that the reflection coefficient of any reflecting surface is likely to change with both age and use. If the toaster is employed to toast raisin bread, for example, the reflectors will soon be covered with raisin particles causing a substantial change in the reflection coefficient even assuming that any such change is uniform over the entire reflecting surface which may not always be the case. When this occurs those portions of the bread slice depending for heat reflected from the specially shaped reflectors will be heated less than when the reflectors were new. Since the direct radiation from the heating elements or heat sources does not substantially change with age or use it is apparent that non-uniform toasting will eventually occur with a design which originally produced uniform toasting by employing specially shaped reflectors and linear heat sources.

The solution to this problem of producing uniform toasting regardless of the age or use of the toaster is the provision of an arrangement which provides uniform heating in the absence of any reflectors and relies upon the reflectors only to increase the efficiency of the operation. To this end plane reflectors 143 and 156 as described above are employed and specially shaped radiators or linear heat sources are employed.

Figure 22:
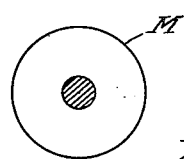
Figs. 22, 23 and 24 are heat radiation patterns to aid in understanding the operation of certain of the heating units of the present invention.
Figure 23:
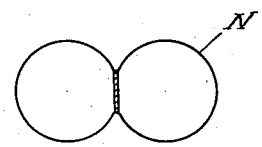
Figure 24:
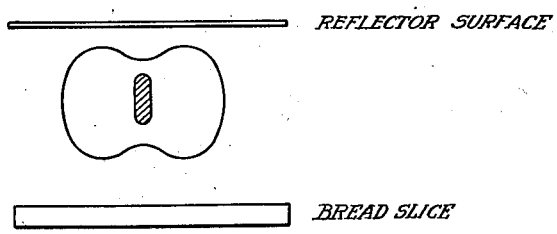

It is known that if the linear source of radiation is cylindrical in cross section, the intensity is uniform in all directions therefrom for the same distance from the element. If on the other hand the cross section of the heat source is a line of infinitely small thickness and finite width the radiation intensity in any direction varies as the cosine of the angle between the normal to the flat face of such an element and the line defining the direction between the heating element and the particular point where the intensity is under consideration. The radiation from a cylindrical cross section heating source is schematically indicated by the circle M in Fig. 22 of the drawings and the radiation from a source having a line cross section is represented by the figure eight diagram N shown in Fig. 23 of the drawings. It would appear from Figs. 22 and 23 that a heat source or radiator intermediate those disclosed in Figs. 22 and 23 and disposed with reference to the bread slice as indicated in Fig. 24 of the drawings should provide a reasonably uniform intensity of radiation at the bread surface. It was found experimentally that if the original circular cross section spiral heating element of linear configuration were compressed by an amount so that the long dimension of the cross section was about two and one half times the narrow dimension that very uniform toasting was obtained using two vertical elements separated from each other by about two inches and the toasting was just as uniform regardless of whether reflectors such as 143 and 156 were employed or not.

It will be understood that a theoretical analysis of the toasting characteristics of the linear heat sources of the present invention can readily be accomplished since the intensity of radiation at any point on a surface to be treated may be expressed by the following formula:

$$J = K \frac{P \cos \alpha}{d}$$

where J is the intensity of radiation at a point on the surface under consideration along which uniform radiation is desired, K is a constant, P is the projection of the heating element as viewed from the point in question on the surface under consideration; $\alpha$ is the angle between a line normal to the surface under consideration at the point under consideration and a line interconnecting said point with the heating element, and d is the distance along the line interconnecting the point on the surface under consideration and the heating element. Neglecting P for a moment, i. e., considering a source of circular cross-section as in Fig. 22, the intensity is a maximum when $\alpha$ is zero degrees and the distance d is a minimum. If the heat source shown in Fig. 23 of the drawings is employed it is apparent that when $\alpha$ equals zero the intensity J is substantially zero since the projected area P is substantially zero. The maximum intensity of radiation would be at points to the right and left of a point corresponding to $\alpha$ equals zero. With the heat source shown in Fig. 23 the projection P is a variable as is also the case with the heat source of Fig. 24. However, with the heat source of Fig. 22 the projection P is constant. In calculating the particular design of heating element necessary for producing uniform heating along a surface it may be considered that each point on the bread slice surface being toasted is heated directly from the two linear sources of energy and from a plurality of image sources displaced in a predetermined manner. The image sources are of course due to reflections from various surfaces within the toaster. From an examination of Fig. 7 of the drawings it is apparent that heat from the linear heat source 140a reaches the adjacent surface of a bread slice disposed in the toasting chamber 67, directly therefrom and also by reflection from the reflector 156, the angular surfaces 46a and 47a adjacent the thermostat end of the toaster and from those portions of the side plates 46 and 47 exclusive of the extensions 46a and 47a but to the left of the toasting chamber 67 as viewed in Fig. 7 of the drawings. Effectively therefore for two linear heat sources such as 140a and 140b each point on the bread surface may be considered to be heated by two direct sources of radiation and ten image sources. The intensity of the radiant energy at any point from the ten image heat sources mentioned may be expressed by the above mentioned radiation intensity formula which in the case of reflected energy is multiplied by the particular reflection coefficient of the reflecting surface involved. Obviously the reflection coefficient of the reflecting surface 156 will be much higher than that of the frame portions mentioned above which are not especially designed for reflecting action. The experimental results conform very closely to the results obtained by the analytical method considering ten image sources and two direct sources for each heating unit. With the end toasting elements of the present invention toasting is practically just as uniform regardless of whether the reflecting plates are employed or not and reflecting plates are employed solely to increase the efficiency of the end heating units. This construction yields toast of a uniformity equal to that obtained with toasting elements of conventional design. In addition it provides a relatively large space between the two linear heat sources for the location of the large opening 168 to collect radiation from the bread surface being toasted to reliably operate the control element. In addition the construction is very simple and inexpensive from a manufacturing standpoint.

An important feature of the automatic toaster described thus far is the fact that it has a relatively small heat capacity as compared to other automatic toasters available on the market. This is very important from the standpoint of the time required to toast the first slice of bread when the toaster is essentially at room temperature as contrasted with the time required for toasting after the toaster has been employed to successively toast a plurality of slices of bread one after the other. With the present invention the time required for toasting the first slice of bread is only 40% longer than for toasting after the toaster has reached an equilibrium temperature following the toasting of a plurality of slices of bread in quick succession. In conventional toasters now available the first slice requires about twice as much toasting time as is required when an equilibrium temperature has been reached following the successive toasting in quick succession of a plurality of slices of bread.

3. *Shielding against direct radiation from heating elements*

It will be understood that the heating elements described above readily permit of adequate shielding of the control device to be described hereinafter so as not to be affected by direct radiation from the heating elements of the toaster. In other words with the arrangement described above it is possible to permit substantially only radiation from the bread slice surface being toasted to pass through the opening or window 168. To further insure that radiant energy from the heating elements 140a and 140b cannot pass through the opening or window 168 the vertical edges of the opening 168 are provided with flanges 193 which extend from the reflector 156 in the same direction as the heating elements 140a and 140b which is clearly shown in Figs. 7, 17 and 18 of the drawings. These flanges 193 cut off any possible direct radiation from the heating elements, 140a and 140b, which might have a tendency to pass through the window 168. In order to prevent radiant energy from the central heating element 103 from passing through the opening 168 in the event that a short bread slice is disposed within the toasting chamber 67 there is provided a shield 194 comprising an angle member having a substantial portion extending horizontally from the top edge of the opening 168. This shield 194 has a vertical flange suitably riveted as by rivets 194a to the reflector 156. It will be understood as the following description proceeds that the opening or window 168 cooperates with a suitable shield associated with the control device described below to prevent other than the desired radiation from reaching the control device for the automatic toaster.

It is possible in the event that the toast is quickly removed from the toaster at the end of a toasting operation that sufficient radiant energy from the central heating element 103 might pass through the opening or window 168. To prevent this a suitable shield 197 (Figs. 5 and 7) is fastened to the bread rack 69. The shield 197 comprises a depending vertical portion 197a which is disposed so as to substantially effectively close the opening 168 to direct radiation from the center heating element 103 when the toast rack 69 is in its upper position shown in Fig. 5 of the drawings. When the bread carriage moves to its lowermost position the depending portion 197a extends through the opening 55 defined in the sub-base 50.

In order to cause any crumbs which might have a tendency to fall through the window or opening 168 to be deflected into the toasting chamber 67 the bottom edge of the window 168 is provided with an angular projection 199.

CRUMB TRAY ASSEMBLY

For the purpose of catching and retaining any crumbs which invariably fall from the bread slices or toast, there is provided a crumb tray assembly disposed in the base 30 of the toaster beneath the sub-base 50. As best shown in Figs. 9 and 10 of the drawings, this crumb tray assembly comprises a bottom cover hinge plate 200 which is suitably fastened to the sub-base 50 by suitable screws 201. These screws 201 preferably also engage suitable ears (not shown) on the molded base 30 to properly position the same relative to the sub-base 50 and consequently relative to the frame 45. The molded base 30 is open at the bottom and this opening is closed by a releasable cover member 202 hingedly related to the bottom cover hinge plate 200 as is clearly shown at 203 in Fig. 10 of the drawings. In order releasably to latch the cover member 202 in the position shown in Fig. 9 of the drawings, the outer surface of the wall 188a defining the chamber for the terminal studs 187 and 191 where they are electrically connected to the appliance power cord 170, is provided with an indentation 205 for receiving a spring latch 206 fastened to the cover member 202 to latch the cover member in the closed position shown in Fig. 9 of the drawings. Preferably the cover member 202 is provided with an extension 202a which extends beyond the end of the base 30 so as to be manually actuated by the operator's finger to open the bottom cover in a simple manner without inverting the toaster. Suitably supported from the top of the bottom cover member are a pair of crumb trays 207 and 208 which are suitably fastened to the bottom cover member 202 by riveting, spot welding or the like. These crumb trays are disposed beneath the openings 55 and 56 respectively in the sub-base 50 so as to be directly beneath the toasting chambers 67 and 68 respectively, thereby receiving any crumbs which might fall from the bread being toasted. It will be apparent that the operator can readily empty the crumb trays by opening the releasable bottom cover member 202.

THERMOSTAT ASSEMBLY

As was mentioned above the control of the toasting operation of the present invention is based upon surface temperature radiation from a substantial area of the surface of the bread slice being toasted, and comprises a thermostat assembly generally indicated at 209 and best shown in Figs. 11 to 14 inclusive of the drawings. This thermal responsive element is adapted to control the switch 172 in response to the heat radiated from one surface of the bread slice being toasted in the toasting chamber 67 which radiated heat energy passes through the window or opening 168, in the reflector 156. The greatest difficulty encountered in employing such a control mechanism as is disclosed in the above mentioned Koci application, is due to the small radiant energy available to produce the desired response. Consequently, it is necessary in order to obtain maximum reliability, that the radiant responsive element, generally designated at 210 in the drawings, collects as much of the surface temperature radiation from the bread slice surface as possible and it was for this reason that the specially designed heating unit 155 described above is provided to permit the employment of the window or opening 168. The radiant control element or thermal responsive device 210 must furthermore be provided with compensating means so as to compensate properly for wide variations in temperature surrounding the control element. Consequently the housing for the thermal responsive device 210 should be kept at the lowest possible temperature, whereby the compensation for ambient temperature may be kept as low as possible.

To this end the thermostat assembly 209 comprises a vertical switch mounting bracket 211 formed of a relatively heavy and rigid material having a high coefficient of heat conductivity. Preferably this mounting bracket is formed of rolled aluminum to readily dissipate as fast as possible heat collected by the thermostat assembly, thereby reducing the compensation required for the thermostat 210. As illustrated the bracket 211 comprises a long vertical column having a lateral extension 211a at the lower end thereof and a shorter lateral extension 211b at the upper end thereof. The vertical arrangement is employed since it provides less horizontal surface for collecting any crumbs which might accidently enter the portion of the toaster in which the thermostat assembly 209 is disposed. The lateral extension 211a provides a suitable mounting means for the bracket 211 as is best shown in Fig. 9 of the drawings. The flange 211a is suitably fastened as by screws 212 in intimate heat conducting relationship with the cover hinge plate 200 whereby in addition to supporting the bracket 211 an additional heat transfer surface is provided to insure still more rapid dissipation of heat collected by the mounting bracket 211. The mounting bracket 211 is furthermore supported between extensions 50f of the sub-base 50 in the form of notched fingers as may be observed in Figs. 3, 4, 7 and 9 of the drawings. The sub-base 50 is furthermore provided with a V-shaped notch 50g at the thermostat end of the toaster to permit the bracket 211 to extend down to the cover hinge plate 200 as described above and the fingers 50f are disposed within the V-shaped notch 50g. To further support the bracket 211 a suitable thermostat adjusting screw 213 is threadedly engaged with a suitable opening defined in the lateral flange 211b. The end of the adjusting screw 213 which is provided with a suitable screw driver engaging slot extends through an opening in the horizontal extension 49a of the top end cross frame plate 51. This opening 49a is very slightly larger than the adjusting screw 213 to permit limited movement of the upper end of the mounting bracket 211. A suitable lock nut 215 is provided as shown in Figs. 3 and 4 of the drawings to maintain the adjusting screw 213 in any desired adjusted position the purpose of which will become apparent from the following description.

The radiant energy responsive device or thermostatic element 210 comprises a single thermostatic strip properly varying in width from the ends thereof to the middle (Fig. 14 of the drawings) so as to obtain the right degree of compensating action with respect to the ambient temperature. This thermostatic element 210 is preferably of the type disclosed in the above mentioned Koci application and further disclosed and claimed in Letters Patent of the United States 2,332,518, Koci, assigned to the same assignee as the present application. The bimetallic element 210 has the ends thereof rigidly clamped to the mounting bracket 211 in such a manner as to subject the strip 210 to a sufficient longitudinal compressive stress to obtain snap acting motion of the center of the strip. As illustrated, the lower end of the element 210 is clamped to the bracket 211 by means of a clamping plate 219 and suitable bolts 220.

The upper end of the bimetallic element 210 is clamped to the mounting bracket 211 by means of a screw 221 which extends through a longitudinally extending slot 222 in the mounting bracket 211. By means of the slot 222 and the adjusting screw 213 proper stress in the longitudinal direction may be applied to the bimetallic element 210 to compel it to move with a snap action within its useful range of movement and to cause it to have stable positions only at substantially the extremes of its motion. In one extreme and stable position the center section of the bimetallic element 210, which might be defined as the portion thereof between the points 210a and 210b in Fig. 12 of the drawings, engages the bracket 211. As will be apparent from the following description this position is attained in response to heating thereof to a relatively high temperature and might be called the high temperature position whereupon intimate contact of the center section of the bimetallic element 210 with the bracket 211 is obtained which causes rapid cooling of the bimetallic element so that it may be moved to its other extreme position against an adjustably positioned stop 224a for a successive toasting operation with no appreciable time delay. The position of the stop 224a as is described hereinafter is adjustable for obtaining the desired color control in response to the position of the color control lever 38.

Essentially, as was mentioned above, the bimetallic element 210 by virtue of the compressive stress applied to the ends thereof is unstable in any position thereof except its two extreme positions, namely the position when the center thereof is against the adjustable stop 224a and the position when the center thereof is in engagement with the bracket 211. When the center of the bimetallic element 210 is heated to a sufficient extent the inherent forces developed therein by virtue of such heating causes it to move away from the stop 224a if it is in engagement therewith so as to snap against the bracket 211. Once the bimetallic element has its center moved against the bracket 211 a manual force must be applied thereto to move it against the adjustable stop 224a where it will remain assuming that the stop 224a is sufficiently away from the bracket 211. The center of the bimetallic element 210 between the points 210a and 210b, which is the portion responsive to the radiant energy from the bread surface, is coated so as to provide the surface of the bimetallic element with a high absorption coefficient for radiation of the type emitted from the toasted bread surface. Preferably the bimetallic element is relatively thin so as to respond with a minimum time lag to a predetermined change in bread surface temperature. However, it must be of sufficient thickness to deliver the desired snap action energy to insure opening of the switch 172 in a manner to be described hereinafter.

In view of the relatively minute quantity of radiant energy obtainable from the bread surface through the window 168 it is essential that all of this energy be directed to the central portion of the bimetallic element 210. To accomplish this there is provided a thermostat reflector housing 226 for substantially enclosing a bimetallic element 210. Essentially the reflector housing 226 comprises an aluminum housing of somewhat trough shape and of sufficient extent to receive the bimetallic element 210 therein. This housing 226 is suitably supported from the bracket 211 as by means of rivets 227. The closed bottom of the trough-shaped housing 226 is disposed against the bracket 211 between the lateral flanges 211a and 211b. A suitable opening is defined in the bottom of the housing 226 as is indicated at 228 so as to permit the central portion of the bimetallic element to intimately engage the bracket 211. Adjacent the central portion of the bimetallic element 210 the housing 226 comprises a flared portion 226a, which is adapted to extend through the window 168 so as to further shield the bimetallic element from other than the desired radiation. The relative position of the flared portion 226a of the housing 226 and the flanges 193 adjacent the window 168 are clearly shown in Fig. 7 of the drawings. By employing this flared construction, heat energy radiated from a substantial area of the bread surface is collected and directed to the main body portion of the reflector housing 226 which is of only slightly greater width than the bimetallic element 210. The angular projection 199 adjacent the bottom of the window 168 is of sufficient width to substantially fit into the narrow trough-shaped portion of the housing 226 thereby deflecting any crumbs which might tend to enter the reflector housing 226 through the window 168. The edges along the open end of the housing 226 engage the reflector 156 of the end heating unit 155. To reduce the heat transfer from the reflector 156, which is relatively hot, to the thermostat assembly 209 to maintain the latter as cool as possible for the purposes mentioned above, the edges of the housing 226 adjacent the reflector 156 are provided with projections 226b to limit to a very small area the contacting portions between the reflector 156 and the housing 226.

It will be apparent that the purpose of the bimetallic element 210 is to open the switch 172 at the end of the toasting operation. This switch 172 is also suitably supported from the bracket 211. As illustrated the contact 174, which is a relatively stationary contact, is supported on a vertically extending leg 242a of an L-shaped conducting member 242, suitably supported by the bolts 220 but insulated therefrom by insulating bushings 243. The horizontal leg of the L-shaped conductor 242 designated as 242b is provided with a tapped opening 245 to permit fastening thereto the end of the bus bar 176. As illustrated the conductor 242 is preferably spaced from the bracket 211 by a suitable spacer 246, and an insulating plate 247 provides the desired insulation between the L-shaped conductor 242 and the spacer plate 246 which is in engagement with the bracket 211.

The contact 173 which might be designated as the movable contact is illustrated as being supported on a spring arm 249 also supported from the bolts 220 extending through the bracket 211. The insulating bushings 243 provide the necessary insulation for insulating the spring arm 249 from the bolts 220. The end of the spring arm 249 fastened to the bracket 211 is electrically connected to a spacer conducting member 250 which includes a terminal extension 250a to which the conductor 192 may be suitably connected as is clearly indicated in Fig. 3 of the drawings to complete the electric circuit to the switch contacts 173 and 174. The terminal and spacer member 250 is insulated from the L-shaped conductor 242 by means of an insulating washer 251. An additional insulating washer 252 further insulates the resilient spring arm 249 from the fastening means associated with the bolts 220 which are illustrated as including cup shaped washers 253. By employing such cup shaped washers it is immaterial that the thickness of the stack of conducting and insulating members comprising insulator 247, L-shaped conductor 242, washer 251, spacer and terminal 250, and washer 252 is not the same as the length of the bushings 243. The inherent resilience of the spring arm 249 is such as to bias the contact 173 into engagement with stationary contact 174.

In order that the movement of the bimetallic element 210 against the bracket 211 in response to a predetermined heating thereof may cause opening of the switch 172, the resilient spring arm 249 extends beyond the end of contact 173 and has an opening 256 defined therein for receiving a reciprocally movable reset pin 257 having a suitable enlarged shoulder 258 formed thereon. For the purpose of suitably insulating the resilient contact arm 249 from the reset pin 257 a sheet of insulation 259 is disposed on either side of the resilient arm 249 and fastened thereto by any suitable means so that the reset pin extending through the opening 256 is electrically insulated from the contact 173. The reset pin 257 is adapted to extend through an opening 260 defined in the bracket 211 so that the end thereof is engageable with the center of the bimetallic element 210. A suitable compression spring 261 surrounds the reset pin and is disposed to bias the reset pin so the shoulder 258 thereof engages with the insulation disposed on the contact arm 249. As illustrated the spring 261 has one end thereof disposed in a counterbore 264 cooperating with the opening 260 in the bracket 211. The other end of the spring 261 is provided with turns of reduced diameter to engage with the shoulder 258. It will be understood that the spring 261 is a relatively weak spring so as not to appreciably affect the force of the resilient contact arm 249 biasing the switch 172 to the closed position. The end of the reset pin 257 adjacent the thermostat 210 is disposed so as to be struck by the bimetallic element 210 while moving from against the stop 224a toward the bracket 211. Pref- erably the bimetallic element moves freely throughout most of its range of motion before it strikes the reset pin 257 to open the switch 172. This is necessary in order to make sure that no frictional or other erratic forces can influence the thermostat 210 in any manner.

The thermostatic strip 210 by its manner of mounting provides for friction free snap acting operation and is self compensating for the effect of ambient temperature as is fully disclosed in the above mentioned copending Koci application. The response characteristic of such a thermostat is adequately suited to the present application since the main thermostatic action is greatest at the exact middle of the thermostatic strip and then gradually reduces until a null point is reached about half way between the middle and the ends. The secondary or compensating action then gradually increases in effect as the ends are approached, becoming greatest in magnitude at the extreme ends adjacent the clamping supports.

For the purpose of making the color control lever 38 effective selectively to control the color of the toast produced by virtue of the operation of the control assembly 209, means are provided to relate the adjustable color control stop 224a with the color control lever 38. Accordingly there is provided an adjustable screw bushing 269 which is rigidly supported in any suitable manner from the lower end of the mounting bracket 211 in a manner so as to be coaxial with the manual cut out plunger 42. This bushing is internally threaded so as to receive a manual adjusting screw 270 which has an opening along the longitudinal axes thereof to receive a reciprocally movable plunger 271 having a head 271a engageable with the end of the screw 270 remote from the lever 38. The color control lever 38 is suitably fastened to the other end of the manual adjusting screw 270 so that pivotal movement of the color control lever 38 causes rotational movement of the manual adjusting screw 270. Preferably the pitch of the threads on the screw 270 and within the bushing 269 are such that limited pivotal movement of the color control lever 38 causes a substantial reciprocal movement of the screw 270. By virtue of the head 271a on the reciprocally movable plunger 271 movement of the screw 270 toward the left as viewed in Fig. 12 of the drawings will also cause similar movement of the plunger 271.

In order to relate the reciprocal movement of the plunger 271, either through indirect action by the color control lever 38 or by direct movement of the plunger 271 without rotation of the screw 270, there is provided a lever 224 which is pivoted intermediate the ends thereof about an axis 275. The upper end of the lever 224 comprises a lateral extension 224a which is the adjustable color control stop described above and clearly shown in Figs. 11 and 14 of the drawings. To permit the color control stop 224a to be disposed within the reflector housing 226 while the pivotal lever 224 is disposed outside this housing a suitable arcuate slot 276 is defined in one side of the reflector housing 226 adjacent the center of the bimetallic element 210. The lower end of the pivotally mounted lever 224 is provided with an L-shaped extension 224b which supports an adjustable pin 277 coaxially disposed with respect to the plunger 271 and engageable with the head 271a thereof. By properly adjusting the position of the pin 277 relative to the L-shaped extension 224b of the lever 224 the position of the color control stop 224a relative to the position of the color control lever 38 may be adjusted. For the purpose of maintaining the pin 277 in constant engagement with the head 271a of the plunger 271 a suitable torsion spring 278 is provided which is illustrated as being concentrically mounted with respect to the axis 275. This torsion spring is adapted to bias the pivotally mounted lever 224 in a clockwise direction as viewed in Fig. 13 of the drawings and one end 278a of the torsion spring 278 is indicated as engaging the lever 224 below the pivotal mounting thereof to produce the desired bias as is clearly shown in Fig. 14 of the drawings. With this arrangement it is apparent that pivotal movement of the color control lever 38 will cause a predetermined movement of the adjustable stop 224a to permit the bimetallic element 210 to be disposed in various positions closer to and farther away from the mounting bracket 211.

It will be understood that it is occasionally desirable to be able to terminate the toasting operation at will prior to the operation of the bimetallic element 210 to open the switch 172. To this end, the cut out plunger 42 provided in the base 30 is disposed in coaxial and abutting relationship with the plunger 271 as is clearly shown in Fig. 9 of the drawings and the torsion spring 278 indirectly biases the cut out plunger 42 to the position shown in Fig. 9. This cut out plunger 42 is adapted to be depressed by thumb manipulation to effectively move the stop 224a toward the mounting bracket 211, thereby to cause the center of the bimetallic element 210 to move out of its one stable position against the stop 224a into its other stable position against the bracket 211 to open the switch 172. Thus there is provided a simple control means which not only permits the desired color control of the toast but which also permits the operator to discontinue the toasting operation at will when this is desired.

As was mentioned above the bimetallic element or thermostat 210 when moved with a snap motion against the bracket 211 either by being heated to a predetermined temperature at the central portion thereof or through actuation of the cut out plunger 42 will open the switch 172 and maintain this switch in the open position once such snap acting motion has occurred. To reclose the switch 172 means must be provided to force the center portion of the thermostat 210 away from the mounting bracket 211 and against the stop 224a. In accordance with the present invention there is provided for this purpose a reset arm 280 which is pivotally mounted about the axis 275 of the lever 224. The reset arm 280 includes a lateral extension 280a which is adapted to engage with a suitable adjustable stop 281 mounted in a suitable support 282 which is preferably fastened to the mounting bracket 211 by one of the rivets 227 which holds the reflector 226 to the mounting bracket 211. Preferably the reset lever 280 is biased against the stop 281 by a suitable spring concentrically disposed with respect to the axis 275. Since the reset arm 280 must be biased in a direction opposite from that of the lever 224 the same torsion spring 278 may be employed for providing a bias for each lever and as illustrated in Fig. 13 of the drawings the end 278b of the torsion spring 278 is hooked over a hooked shaped extension 280b of the reset lever 280. It should be understood however that although a single spring 278 is illustrated for biasing both levers in the desired directions that two separate springs might equally well be employed for this purpose and where different biasing forces are desired two separate springs are essential.

In order that pivotal movement in a clockwise direction as viewed in Fig. 13 of the drawings of the reset lever 280 may cause closing of the switch 172, the reset lever is provided with an arm 283 preferably formed as an integral part thereof including a lateral extension 283a for engaging with the end of the reset pin 257 extending through the opening 256 in the end of the resilient arm 249. When it is desired to close the switch 172 the reset arm 280 is moved against the biasing force of the torsion spring 278 so as to move the reset pin 257 to the left as viewed in Fig. 12 of the drawings thereby to cause the thermostat 210 to snap against the adjustable stop 224a.

As was mentioned above it is desirable to provide an arrangement whereby the operator merely inserts a bread slice into the toasting slot and thereafter the automatic toaster functions to move the bread slice to the toasting position, to toast the bread slice and subsequently return the toasted bread slice to a position where it may readily be removed by the operator. In accordance with the present invention means are provided responsive to the insertion of a bread slice into the toasting chamber 67 to move the reset lever 280 in a clockwise direction as viewed in Fig. 13 of the drawings whereby the bimetallic element 210 is moved against the stop 224a and the switch 172 is closed. The two positions of the reset arm 280 are clearly shown in Figs. 5 and 6 of the drawings. To this end the automatic toaster 25 of the present invention is provided with a trip lever 285 which is engageable by a slice of bread inserted in the toasting chamber 67. As illustrated the trip lever 285 is formed of wire stock and includes a zig-zag shaped portion 285a which extends across the toasting chamber 67 above the bread rack 69. The trip lever further includes a pair of side arms 285b which extend along the outside of the frame 45 of the toaster and terminate in bearing portions 285c which are disposed to pivot in the center of the three openings defined by the cooperating portions 72a and 77a of the side arms 72 and yoke 77 of the bread carriage 79. The trip lever therefore is free to pivot about the axes 285c so as to describe a limited arcuate path for the zig-zag portion 285a within the toasting chamber 67. To permit such arcuate movement of the trip lever 285 the slots 74 in the side frame plates 46 and 47 as was mentioned above are substantially longer than the slots 75.

For the purpose of transmitting pivotal motion of the trip lever 285 to the reset arm 280 one of the bearing portions 285c of the trip lever is provided with an integral extension in the form of a crank 285d which includes a lateral projection 285e. With this arrangement it is apparent that substantially vertical movement of the zigzag portion 285a of the trip lever 285 within the toasting chamber 67 will produce somewhat horizontal movement of the lateral projection 285e and consequently may be employed to cause pivotal movement of the reset lever 280. In order normally to bias the trip lever 285 to the position shown in Figs. 3 and 5 of the drawings against the upper end of the slot 74 a suitable tension spring 287 is provided which is illustrated as interconnecting the yoke 77 of the bread carriage 79 with the lateral projection 285e of the trip lever 285. The force supplied by the tension spring 287 is preferably only sufficient to counteract the weight of the trip lever 285 itself. Consequently when the weight of a bread slice engages the portion 285a of the trip lever 285 the trip lever pivots about its axis 285c from the position shown in Fig. 5 of the drawings to the position shown in Fig. 6 of the drawings. The tension spring 287 is shown in its stressed condition in Fig. 6 of the drawings.

As is disclosed and broadly claimed in co-pending Koci application, Serial No. 436,649, filed March 28, 1942, and assigned to the same assignee as the present application it is desirable in moving the bimetallic element 210 against the stop 224 by an external force to release such external force in a gradual manner to avoid bouncing the bimetallic element away from the stop 224a. In accordance with this Koci application, Serial No. 436,649 it is desirable to release this force gradually so that the bimetallic element will not tend to move the switch 172 to the open position prematurely. To this end there is provided a pivotally mounted trigger 290 for transferring the force from the lateral projection 285e of the trip lever 285 to the reset arm 280. As illustrated the trigger 290 comprises an arcuate surface 291 supported by a pair of laterally extending arms 293 which are pivotally mounted as illustrated to integral projections 280c of the reset arm 280. In order to limit the maximum pivotal movement of the trigger 290 relative to the reset arm 280 the reset arm is provided with an extension 280d which is engaged by the arcuate portion 291 of the trigger 290 to limit the maximum clockwise movement thereof as viewed in Fig. 13 of the drawings. The maximum counterclockwise rotation as viewed in Fig. 13 of the drawings is limited by the extension 280e shown in Fig. 14 of the drawings.

If a bread slice is inserted into the toasting chamber 67 in the manner shown in Fig. 6 of the drawings the trip lever 285 pivots about its axis 285c and the lateral projection 285e thereof moves the reset arm 280 to the position shown in Fig. 6 of the drawings through the trigger 290 thereby closing the switch 172. From the above discussion it will be apparent that if the switch 172 is closed the heating elements of the automatic toaster are energized and the thermomotive device 60 functions to gradually lower the bread carriage 79. As the bread carriage lowers the trip lever 285 which is pivotally mounted thereto also moves downwardly so that the lateral projection 285e thereof tends to move away from the trigger 290. By virtue of the arcuate surface 291 and the pivotal mounting of the trigger 290 the force applied to the reset plunger 257 by the reset arm 280 is released gradually thereby limiting any tendency for the bimetallic element 210 to move prematurely from its position against the stop 224a to its position against the bracket 211. It will be understood that since the bimetallic element moves with a snap action against the stop 224a it might, if still relatively warm, tend to bounce back to its other position if it were not for this gradual release of force described above.

Figure 20:
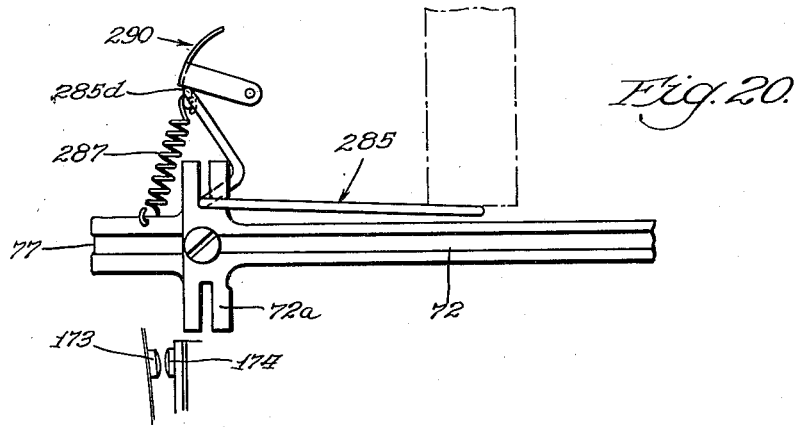
Fig. 20 is a somewhat schematic view of the bread carriage, trip lever and associated apparatus of the automatic toaster of the present invention with the parts in the positions assumed after the toasting opeartion has been completed and the toast moved to the non-toasting position, but before the toast has been removed from the toasting chamber.

By employing the trigger 290 an additional desirable feature of the present invention is provided namely the elimination of recycling of the toaster at the end of the toasting operation without first removing the bread slice and inserting a new bread slice. Consequently the trigger member 290 prevents continous up and down cycling of the bread carriage 79 and it is necessary to lift the bread slice disposed within the toasting chamber 67 upwardly a distance of at least an inch before the control device can recycle. This feature of the present invention will be apparent from an examination of Figs. 4, 5, 6 and 20 of the drawings. The insertion of a bread slice into the toasting chamber 67 causes the trip lever 285 to assume the positions shown in Figs. 4, 6 and 20 of the drawings, whereupon the lateral projection 285e is moved closer to the reset arm 280. When the toasting cycle has been completed and the bread carriage 79 moves upwardly to the position shown in Fig. 20 of the drawings the lateral projection 285e of the trip lever 285 engages with the under side of the trigger 290 and pivots the same about its axis 290c. Consequently as long as the bread slice remains within the toasting chamber 67 no force can be transmitted through the trigger 290 to pivot the reset arm in a clockwise direction about its axis 275 as viewed in Fig. 13 of the drawings. When the bread slice in the toasting chamber 67 is removed however the spring 287 causes the trip lever 285 to move to the position shown in Fig. 5 of the drawings so that the lateral projection 285e thereof moves away from the reset arm 280 thereby permitting the trigger 290 to pivot from the position shown in Fig. 20 of the drawings to the position shown in Fig. 5 of the drawings. If the bread slice is lifted about an inch and then reinserted the toasting operation will be reinitiated. Conventionally, of course, the toasted bread slice will be completely removed and a new slice inserted for a subsequent toasting operation.

In view of the detailed description included above the operation of the automatic toaster of the present invention will be understood by those skilled in the art. Briefly when a bread slice is inserted in the toasting chamber 67 the trip lever 285 is pivoted about its axis from the position shown in Fig. 5 to the position shown in Fig. 6 of the drawings solely by virtue of the weight of the bread slice, and consequently the reset arm 280 is moved to engage the reset plunger and move the bimetallic element 210 against the color control stop 224a. The inherent resilience of the contact arm 249 causes engagement of the switch contacts 173 and 174 thereby closing the circuit through the heating elements as is clearly apparent from Fig. 19 of the drawings. It will be understood that the color control lever 38 will have been set to a desired position prior to initiating the toasting cycle. By energizing the heating elements a rapid expansion of the heater wire 103 of the center heating element occurs and the force applied by the yokes 108, 112 and 113 to the depressor bar 58 is removed sufficiently to permit the weight of the bread carriage 79 and the bread slice supported thereon to move the carriage downwardly until stopped by the sub base 50. By virtue of the motion multiplying means described above a very limited movement of the depressor bar 58 permits a very great movement of the bread carriage 79. The parallel lever arms 80 and 81 maintain the bread carriage 79 in a substantially horizontal position. When the bread surface of the bread slice within the toasting chamber 67 reaches a predetermined temperature as determined by the setting of the color control lever 38 the middle portion of the bimetallic element 210 is heated sufficiently by radiation from the bread surface which is permitted to pass through the window 168 so that the center portion of the bimetallic element snaps against the bracket 211. In so doing it strikes the reset pin 257 which causes opening of the switch 172 and deenergization of the heating elements 103, 140a, 140b, 141a and 141b. In cooling the heater wire 103 contracts so as to cause the depressor bar 58 to move downwardly. This motion is transmitted through the mechanism described in detail above to upward motion of the bread carriage 79, which moves to the position shown in Fig. 20 of the drawings. When the bread slice is later removed the trip lever will move to the position shown in Fig. 5 of the drawings and the projection 285e thereof will move outwardly to permit the trigger 290 to move from the position shown in Fig. 20 to the position shown in Fig. 5 of the drawings whereby the mechanism is in condition for a subsequent toasting cycle.

By virtue of the control arrangement of the automatic toaster 25 the same bread slice may be inserted several times and the second or third toasting of the same bread slice will not substantially darken the same as contrasted with conventional toasters where the toasting operation is controlled by thermal or clock timers and successive toasting of the same slice will cause burning thereof.

As will be evident from the above explanation, the structure herein shown and described is such as to be free of substantially all of the objections heretofore associated with so-called automatic toasters, and likewise avoids the difficulties heretofore associated with such toasters, due to abnormal manipulation and use thereof. Thus, the degree of toasting of slices subsequent to the first of a series is not affected by premature removal of the prior slices of toast. During the toasting period the thermostat is shielded from the heating elements and receives its energy primarily from the bread surface, and therefore changes in the voltage applied to the device during the toasting interval have substantially no effect on the color of the toast, at least within the voltage ranges normally encountered. Furthermore, the thermostatic strip is responsive to the average temperature of the bread surface as distinguished from a relatively small area, and consequently the presence of holes or local variations in the color of the bread does not materially affect the operation. Moreover, differences in the initial color of the bread, as, for example, color differences between white bread, whole wheat and rye bread do not substantially affect the degree of toasting. Further, differences in the moisture content of different slices do not cause variations in the degree of toasting of the toasted slices.

While only a single embodiment of the present invention has been described and illustrated it should be understood that the present invention is capable of various changes and modifications. It is intended in the appended claims to cover all such changes and modifications as fall within the true spirit and scope of the present invention.

What is claimed as new and desired to be secured by Letters Patent of the United States is:

1. A thermomotive device for converting electrical energy to heat to cause expansion of a metal and consequently to produce mechanical work comprising a pair of spaced parallel supporting struts, a plurality of turns of an electrical resistance wire of relatively small surface area supported by said struts, a V-shaped yoke having a very wide angle approaching 180° between the arms of the V interconnecting said struts to provide a motion multiplying means for converting limited relative movement of said struts to substantial movement of the center of said yoke, means for applying a force to the center of said yoke tending to cause separation of said struts and stressing of said turns of wire in tension, and means for causing an electric current to flow through said wire to heat and expand the same to permit substantial movement of the center of said yoke in response to the application of said force.

2. A thermomotive device for converting electrical energy to heat to cause expansion of a metal and consequently to produce mechanical work comprising a pair of spaced parallel vertically disposed supporting struts, a plurality of turns of an electrical resistance wire of relatively small surface area wound around said struts, a V-shaped yoke having a very wide angle between the arms of the V approaching 180° interconnecting said struts to provide a motion multiplying means for converting limited relative horizontal movement of said struts to substantial vertical movement of the center of said yoke, means for applying a vertical force to the center of said yoke causing relative separation of said struts and stressing of said turns of wire in tension, means for causing an electric current to flow through said wire to heat and expand the same to permit substantial movement of the center of said yoke in response to the application of said vertical force, and means for limiting the maximum movement of said center of said yoke and consequently the maximum separation of said struts whereby continued expansion of said wire with heating thereof decreases the tensile force applied thereto at high temperatures after said last mentioned means becomes effective.

3. A thermomotive device for converting electrical energy to heat to cause expansion of a metal and consequently to produce mechanical work comprising a pair of spaced parallel supporting struts, a plurality of turns of an electrical conductor of high resistance and relatively small surface area wound in spaced relationship about said struts, means for insulating said conductor from said struts, a pair of V-shaped yokes having a very wide angle between the arms of the V approaching 180° interconnecting the ends of said struts to provide a somewhat rectangular frame, said frame being arranged to produce substantial relative movement between the centers of the V-shaped yokes in response to limited relative movement of said struts, a controlled device connected to the center of one of said yokes applying a force effective to cause separation of said struts and stressing of said conductor in tension, and means for causing an electric current to flow through said conductor to heat and expand the same to move said controlled device, and means for limiting the maximum movement of said controlled device in response to heating of said conductor to relieve the tensile stress on said conductor at high temperature thereof by virtue of continued expansion of said conductor without continued relative movement of said struts.

4. In an automatic toaster, a thermomotive device for converting electrical energy to mechanical energy through the production of heat, comprising, a pair of spaced parallel supporting struts, a plurality of turns of an electrical resistance wire of relatively small surface area wound around said struts, a V-shaped yoke having a very wide angle between the arms of the V approaching 180° interconnecting said struts to provide a motion multiplying means for converting limited relative movement of said struts toward and away from each other to substantial movement of the center of said yoke, a movable carriage for supporting bread to be toasted in said toaster, means for applying the weight of said bread carriage to the center of said yoke to tend to cause relative separation of said struts and stressing of said turns of wire in tension, said wire being initially stressed when cold to support said bread carriage in an upper toast receiving position, means for causing an electric current to flow through said wire to heat and expand the same to permit substantial movement of the center of said yoke under the weight of said bread carriage whereby the gradual expansion of said wire with heating permits said bread carriage to move with relatively uniform motion to a toasting position and stop means engageable by said bread carriage for limiting the maximum downward movement thereof, whereby continued expansion of said wire with heating decreases the tensile force applied thereto at high temperatures after said carriage engages said stop means.

5. The combination in an automatic toaster of a movable bread carriage having an upper toast receiving position and a lower toasting position and automatic thermomotive means for controlling the movement of said carriage between said positions, said thermomotive means comprising a pair of spaced parallel supporting struts, a plurality of turns of an electrical conductor of relatively high resistance and having a relatively small surface area wound around said struts, yoke means interconnecting said struts to provide a motion multiplying means for converting limited relative movement of said struts toward and away from each other to a substantial movement of a portion of said yoke means, means interconnecting said carriage and said yoke means so that the weight of said bread carriage tends to cause relative separation of said struts and consequent stressing in tension of said conductor turns, said conductor being initially stressed when at room temperature to support said bread carriage in said toast receiving position, means for causing an electric current to flow through said conductor to heat and expand the same to permit substantial movement of said yoke under the weight of said bread carriage whereby the gradual expansion of said conductor with heating permits said bread carriage to move with relatively uniform motion to said toasting position, and stop means engageable by said carriage for limiting the maximum downward movement of said carriage, whereby continued expansion of said conductor with heating after said carriage engages said stop means decreases the tensile force on said conductor at high temperatures thereof.

6. The combination in an automatic toaster of a movable bread carriage having an upper toast receiving position and a lower toasting position and thermomotive means for controlling the movement of said carriage between said positions, said thermomotive means comprising a pair of spaced parallel supporting struts, a plurality of turns of an electrical conductor of relatively high resistance and having a relatively small surface area wound around said struts, yoke means interconnecting said struts to provide a motion multiplying means for converting limited relative movement of said struts toward and away from each other to a substantial movement of a portion of said yoke means, means interconnecting said carriage and said yoke means for applying the weight of said bread carriage to said yoke means to tend to cause relative separation of said struts and consequent stressing in tension of said conductor, said conductor being initially stressed when at room temperature to support said bread carriage in said toast receiving position, and means for causing an electric current to flow through said conductor to heat and expand the same to permit substantial movement of said yoke under the weight of said bread carriage whereby the expansion of said conductor with heating permits said bread carriage to move with relatively uniform motion to said toasting position.

7. An automatic toaster comprising a frame, a bread carriage movable relative to said frame between an upper bread slice receiving position and a lower toasting position, first stop means on said frame engageable by said carriage to limit its maximum upward movement to its bread slice receiving position, second stop means on said frame engageable by said carriage to limit its maximum downward movement to its lower toasting position, a pair of spaced parallel supporting struts associated with said frame, yoke means interconnecting said struts to provide a motion multiplying means for converting limited relative movement of said struts toward and away from each other to a substantial movement of a portion of said yoke means, means interconnecting said carriage and said yoke for converting the weight of said bread carriage to a force tending to produce relative separation of said struts, means comprising a wire wound about said struts to limit the relative separation thereof, said wire being stressed in tension to such an extent when at room temperature to move said carriage against said first stop means even when loaded with bread slices or toast, means for causing an electric current to flow through said wire to heat and expand the same to permit substantial movement of said yoke under the weight of said bread carriage whereby the gradual expansion of said conductor with heating permits said bread carriage to move with relatively uniform motion from engagement with said first stop means into engagement with said second stop means.

8. An automatic toaster comprising a frame, a bread carriage movable relative to said frame between an upper bread slice receiving position and a lower toasting position, first stop means on said frame engageable by said carriage to limit its maximum upward movement to its bread slice receiving position, second stop means on said frame engageable by said carriage to limit its maximum downward movement to its lower toasting position, a pair of spaced parallel supporting struts, associated with said frame, yoke means interconnecting said struts to provide a motion multiplying means for converting limited relative movement of said struts toward and away from each other to a substantial movement of a portion of said yoke means, means interconnecting said carriage and said yoke for converting the weight of said bread carriage to a force tending to produce relative separation of said struts, means comprising a wire wound about said struts to limit the relative separation thereof, said wire being stressed in tension to such an extent when at room temperature to move said carriage against said first stop with substantial force even when loaded with bread slices or toast, means responsive to the positioning of a bread slice on said carriage for causing an electric current to flow through said wire to heat and expand the same to permit said bread carriage to move with relatively uniform motion from engagement with said first stop means into engagement with said second stop means, and means responsive to a predetermined toasting of a bread slice on said carriage for stopping the flow of current through said wire, whereby the contraction thereof with cooling automatically moves said carriage from said toasting position to said bread slice receiving position.

9. An automatic toaster comprising a frame, a bread carriage movable relative to said frame between an upper bread slice receiving position and a lower toasting position, first stop means engageable by said carriage to limit its maximum upward movement to its bread slice receiving position, second stop means engageable by said carriage to limit its maximum downward movement to its lower toasting position, a conductor of substantial resistance mounted in insulated relationship relative to said frame, means for converting the weight of said bread carriage and any bread slice supported thereon to a tensile force on said conductor, said tensile force being sufficient when said conductor is at low temperature of the order of room temperature for moving said carriage into its bread slice receiving position in engagement with said first stop means, means including an electric switch for controlling the flow of current through said conductor, means for closing said switch to cause heating and expansion of said conductor thereby decreasing the tensile force thereon sufficiently to permit said bread carriage to move to its toasting position, and control means for opening said switch to deenergize said conductor, the cooling of said conductor causing contraction thereof and movement of said carriage from its toasting position to its bread slice receiving position.

10. An automatic toaster comprising a frame, a bread carriage movable relative to said frame between an upper bread slice receiving position and a lower toasting position, stop means engageable by said carriage to limit its maximum upward movement to its bread slice receiving position, a resistance wire mounted in insulated relationship relative to said frame, means for converting the weight of said bread carriage and any bread slice supported thereon to a tensile force on said wire, said tensile force being sufficient when said wire is at low temperature of the order of room temperature for moving said carriage into its bread slice receiving position in engagement with said stop means, means including an electric switch for controlling the flow of current through said wire, means responsive to the placing of a bread slice on said carriage for closing said switch to cause heating and expansion of said wire thereby decreasing the tensile force thereon sufficiently to permit said bread carriage to move to its toasting position, and control means for opening said switch to deenergize said wire, the cooling of said wire causing contraction thereof and movement of said carriage from its toasting position to its bread slice receiving position against said stop means.

11. An automatic toaster comprising a frame, a bread carriage movable relative to said frame between an upper bread slice receiving position and a lower toasting position, stop means supported by said frame and engageable by said carriage to limit its maximum upward movement to its bread slice receiving position, a resistance conductor mounted in insulated relationship relative to said frame, means for converting the weight of said bread carriage to tensile force on said conductor, said tensile force being sufficient when said conductor is at low temperature of the order of room temperature for moving said carriage into its bread slice receiving position in engagement with said stop means even while supporting one or more bread slices thereon, means including an electric switch for controlling the flow of current through said conductor, means for closing said switch to cause heating and expansion of said conductor thereby decreasing the tensile force thereon sufficiently to permit said bread carriage to move to its toasting position, and control means responsive to a predetermined toasting of a bread slice on said carriage for opening said switch to deenergize said conductor, the cooling of said conductor causing contraction thereof and movement of said carriage from its toasting position to its bread slice receiving position against said stop means.

12. An automatic toaster, a bread carriage, means for supporting said carriage for movement between an upper bread slice receiving position and a lower toasting position, a resistance conductor mounted in insulated relationship relative to said first mentioned means, means for converting the weight of said bread carriage and any bread slice supported thereon to tensile force on said conductor, said tensile force being sufficient when said conductor is at low temperature of the order of room temperature for moving said carriage into its bread slice receiving position, means including an electric switch for controlling the flow of current through said conductor, means responsive to the placing of a bread slice on said carriage for closing said switch to cause heating and expansion of said conductor thereby decreasing the tensile force thereon sufficiently to permit said bread carriage to move to its toasting position, and thermal responsive control means for opening said switch in response to the completion of the toasting operation to deenergize said conductor, the cooling of said conductor causing contraction thereof and movement of said carriage from its toasting position to its bread slice receiving position.

13. The combination in a cooking device of spaced heating elements for performing a cooking operation on an article disposed therebetween, a movable carriage for moving an article toward and away from a position between said heating elements, a thermomotive device including a plurality of turns of an electrical conductor capable of expanding and contracting with heating and cooling connected in circuit with said heating elements, a control switch for controlling simultaneously the supply of electrical energy to said heating elements and said electrical conductor of said thermomotive device, and means for converting the contraction of said conductor with cooling to a force sufficient to move said carriage away from a position between said heating elements, said carriage being free to move to its position between said heating elements upon expansion of said wire, whereby movement of said carriage occurs automatically in response to operation of said switch.

14. The combination in a cooking device of spaced heating elements for performing a cooking operation on an article disposed therebetween, a movable carriage for moving said article toward and away from a position between said heating elements, an electric conductor, means responsive to the heating and cooling of said conductor in response to whether or not current flows therethrough for moving said carriage toward and away from said heating elements, an electric circuit including said conductor and said heating elements, a control switch for controlling the supply of electrical energy to said electric circuit, means responsive to the placing of said article on said carriage for closing said switch, and means responsive to a predetermined condition of said article during heating thereof for opening said switch.

15. The combination in a toaster of spaced heating elements for performing a toasting operation on a bread slice disposed therebetween, a movable carriage for moving said bread slice toward and away from a position between said heating elements, an electric conductor stressed in tension to hold said carriage away from a position between said heating elements, said conductor being capable of being heated rapidly to a high temperature in response to the flow of current therethrough, the expansion of said conductor with such heating being sufficient to reduce the tension sufficiently to permit movement of said carriage toward said heating elements, an electric circuit including said conductor and said heating elements, a control switch for controlling the supply of electrical energy to said electric circuit, means responsive to the placing of said bread slice on said carriage for closing said switch, and means responsive to a predetermined condition of said bread slice during heating thereof for opening said switch.

16. The combination in a toaster of spaced heating elements for performing a toasting operation on a bread slice disposed therebetween, a movable carriage for moving said bread slice toward and away from a position between said heating elements, an electric conductor stressed in tension to hold said carriage away from a position between said heating elements, said conductor being capable of being heated rapidly to a high temperature in response to the flow of current therethrough, the expansion of said conductor with such heating being sufficient to reduce the tensile stress thereon to permit movement of said carriage toward said heating elements, an electric circuit including said conductor and said heating elements connected in series, a control switch for controlling the supply of electrical energy to said electric circuit, means responsive to the placing of said bread slice on said carriage for closing said switch to render said heating elements effective and move said carriage between said heating elements, and means responsive to a predetermined condition of said bread slice during heating thereof for opening said switch to render said heating elements ineffective and to cause said conductor to contract sufficiently to move said carriage from between said heating elements.

17. In an automatic toaster, a frame, a bread carriage movable between a position near the upper part of said frame and a position near the lower part of said frame, pivotal means interconnecting said carriage and said frame, motive means, means including a plurality of pivotally related members for interconnecting said motive means and said pivotal means whereby operation of said motive means causes movement of said carriage, and means for reducing the friction at all bearing points where appreciable bearing pressure exists comprising a flat surface of sufficient width at each bearing point normal to the direction of the associated bearing pressure to provide rolling action at each of these bearing points within the range of bearing movement.

18. In an automatic toaster, a frame, a horizontally disposed bread carriage movable in a vertical direction between a position near the upper part of said frame and a position near the lower part of said frame, pivotal means interconnecting said carriage and said frame, means including said pivotal means for maintaining said bread carriage in a substantially horizontal position throughout such vertical movement thereof, motive means, means including a plurality of pivotally related members for interconnecting said motive means and said pivotal means whereby operation of said motive means causes movement of said carriage, and means for reducing the friction at all bearing points where appreciable bearing pressure exists comprising a flat surface of sufficient width at each bearing point normal to the direction of the associated bearing pressure to provide rolling action at each of these bearing points within the range of bearing movement.

19. In an automatic toaster, a frame, a bread carriage movable between a position near the upper part of said frame and a position near the lower part of said frame, parallel motion lever means pivotally interconnecting said carriage and said frame with a long lever arm so that limited movement of said lever means through a short arc causes substantial movement of said carriage, motive means, means including a plurality of pivotally related members for interconnecting said motive means and said lever means with a short effective lever arm whereby operation of said motive means causes movement of said carriage, and means for reducing the friction at all bearing points of said lever means and pivotally related members where appreciable bearing pressure exists comprising a flat surface of sufficient width at each bearing point normal to the direction of the associated bearing pressure to provide rolling action at such bearing points within the range of bearing movement.

20. In an automatic toaster, a frame, a bread carriage movable between a position near the upper part of said frame and a position near the lower part of said frame, pivotal means interconnecting said carriage and said frame, motive means, a depressor bar, means responsive to operation of said motive means for causing movement of said depressor bar, a lifter lever pivoted to said frame at an intermediate point thereon, means pivotally relating one end of said lifter lever and said depressor bar, means pivotally relating the other end of said lifter lever and said pivotal means whereby operation of said motive means causes movement of said carriage and limited pivotal movement at the bearing points pivotally interrelating said depressor bar, lifter lever, pivotal means and frame, and means for reducing the friction at all bearing points where appreciable bearing pressure exists comprising a flat surface of sufficient width at each bearing point normal to the direction of the associated bearing pressure to provide rolling action at these bearing points within the range of bearing movement.

21. A toaster comprising a frame, a plurality of spaced heating units supported by said frame, a bread carriage movable between a position where said heating units are effective to toast any bread slices supported thereon and a position where said heating units are ineffective to produce such toasting action, pivotal means interconnecting said carriage and said frame, motive means, means including a plurality of pivotally related members for interconnecting said motive means and said pivotal means whereby operation of said motive means causes movement of said carriage, and means for converting sliding friction at all bearing points where appreciable bearing pressure exists to rolling friction comprising a flat surface of sufficient width at each bearing point normal to the direction of the associated bearing pressure to provide rolling action at such bearing points within the range of bearing movement.

22. The combination in a toaster of spaced heating elements for performing a toasting operation on a plurality of bread slices disposed therebetween, a movable carriage for moving said bread slices toward and away from a position between said heating elements, pivotally mounted, parallel motion means for moving said carriage and maintaining said carriage in a substantially horizontal position during such movement, means responsive to the placing of a bread slice on said carriage for causing limited pivotal movement of said parallel motion means, and substantially frictionless bearings for said parallel motion means comprising a flat surface of sufficient width at each bearing point normal to the direction of the associated bearing pressure for causing rolling rather than sliding movement to occur.

23. The combination in a cooking device of a heating element for performing a cooking operation on an article disposed in a cooking position adjacent thereto, a movable carriage for moving an article toward and away from said cooking position adjacent said heating element, an electric conductor, means responsive to the expansion and contraction with heating and cooling of said conductor for moving said carriage toward and away from said cooking position, an electric circuit including said conductor and said heating element whereby both will be energized at the same time for a substantial period of time, and a control switch for controlling the supply of electrical energy to said electric circuit.

24. The combination in a toaster of a heating element for performing a toasting operation on the bread slice disposed in a toasting position adjacent thereto, a movable carriage for moving said bread slice toward and away from said toasting position, an electric conductor of relatively small cross section, means responsive to the expansion and contraction with heating and cooling of said conductor for moving said carriage toward and away from said toasting position, an electric circuit including said conductor and said heating element whereby both will be energized at the same time for a substantial period of time, and a control switch for controlling the supply of electrical energy to said electric circuit whereby the current flowing through said conductor causes heating thereof.

LUDVIK J. KOCI.

References Cited in the file of this patent

UNITED STATES PATENTS

| Number | Name | Date |
|---|---|---|
| 46,898 | Hammond | Mar. 21, 1865 |
| 358,728 | Campbell | Mar. 1, 1887 |
| 666,570 | Steutermann | Jan. 20, 1901 |
| 912,175 | Rukes | Feb. 9, 1909 |
| 918,163 | Kemp | Apr. 13, 1909 |
| 954,682 | Low et al. | Apr. 12, 1910 |
| 1,082,115 | Ellegaard | Dec. 23, 1913 |
| 1,260,300 | Bangerter | Mar. 26, 1918 |
| 1,900,737 | Rohne | Mar. 7, 1933 |
| 2,012,603 | Fuchs | Aug. 27, 1935 |
| 2,030,932 | Persons | Feb. 18, 1936 |
| 2,203,719 | Crane | June 11, 1940 |
| 2,266,045 | Ireland | Dec. 16, 1941 |
| 2,266,301 | Biebel | Dec. 16, 1941 |
| 2,288,699 | Gomersall | July 7, 1942 |
| 2,288,713 | Ireland | July 7, 1942 |
| 2,288,748 | Scharf | July 7, 1942 |
| 2,301,070 | Myers | Nov. 3, 1942 |
| 2,332,518 | Koci | Oct. 26, 1943 |
| 2,337,098 | Gomersall | Dec. 21, 1943 |
| 2,347,385 | Wright et al. | Apr. 25, 1944 |
| 2,396,541 | Taylor | Mar. 12, 1946 |
| 2,426,620 | Koci | Sept. 2, 1947 |
| 2,459,169 | Koci | Jan. 18, 1949 |
| 2,459,170 | Koci | Jan. 18, 1949 |
| 2,462,607 | Brown | Feb. 22, 1949 |
| 2,474,728 | Doran | June 28, 1949 |

FOREIGN PATENTS

| Number | Country | Date |
|---|---|---|
| 794,762 | France | Dec. 26, 1935 |